United States Patent
Manepalli et al.

(10) Patent No.: US 12,451,099 B2
(45) Date of Patent: Oct. 21, 2025

(54) DYNAMIC REFRESH RATES IN MULTI-DISPLAY SYSTEMS

(71) Applicant: Intel Corporation, Santa Clara, CA (US)

(72) Inventors: Sangeeta Ghangam Manepalli, Chandler, AZ (US); Philippe Lecluse, Braine l'Alleud (BE); Bart Plackle, Molenstede (BE); Kurt Herremans, Hasselt (BE)

(73) Assignee: Intel Corporation, Santa Clara, CA (US)

( * ) Notice: Subject to any disclaimer, the term of this patent is extended or adjusted under 35 U.S.C. 154(b) by 735 days.

(21) Appl. No.: 17/535,433

(22) Filed: Nov. 24, 2021

(65) Prior Publication Data
US 2022/0084481 A1 Mar. 17, 2022

(51) Int. Cl.
| | | |
|---|---|---|
| *G09G 5/00* | (2006.01) | |
| *G09G 3/36* | (2006.01) | |
| *G09G 5/12* | (2006.01) | |
| *G09G 5/18* | (2006.01) | |

(52) U.S. Cl.
CPC ......... *G09G 5/001* (2013.01); *G09G 3/3618* (2013.01); *G09G 5/12* (2013.01); *G09G 5/18* (2013.01); *G09G 2310/08* (2013.01); *G09G 2360/18* (2013.01)

(58) Field of Classification Search
CPC ........ G09G 5/001; G09G 3/3618; G09G 5/12; G09G 5/18; G09G 2310/08; G09G 2360/18; G09G 2340/0435; G09G 2360/06; G09G 5/363; G09G 5/008; G09G 2300/026; G06F 3/1446
See application file for complete search history.

(56) References Cited

U.S. PATENT DOCUMENTS

| | | | |
|---|---|---|---|
| 2013/0159401 A1* | 6/2013 | Sukeno ................. | G06F 3/1446 709/203 |
| 2015/0340009 A1* | 11/2015 | Loeffler ................... | G09G 5/04 345/1.3 |

OTHER PUBLICATIONS

VESA "VESA DisplayPort (DP) Standard, Version 2.0," (See Table of Contents and Appendix K, Adaptive-Sync), Video Electronics Standards Association, Jun. 26, 2019 (13 pages).

* cited by examiner

*Primary Examiner* — Devona E Faulk
*Assistant Examiner* — Donna J. Ricks
(74) *Attorney, Agent, or Firm* — Alliance IP, LLC

(57) ABSTRACT

In multi-display systems, such as video walls, comprising a control computing system providing content to multiple display computing systems driving a plurality of displays, the refresh rates of the displays can drift over time. This drift can introduce display artifacts, which can make for an unpleasant viewing experience. To counteract display refresh drift, a control system periodically compares display refresh timestamps of the individual display systems to a reference display refresh timestamp of a reference display system. If the difference exceeds a threshold, the control system determines clock adjustment information that is sent to the display system exhibiting drift. The display system utilizes the clock adjustment information to adjust the frequency of a display system clock, which can be done by writing the clock adjustment information to registers that control the behavior of a phase-locked loop that generates the clock used by display refresh circuitry.

18 Claims, 11 Drawing Sheets

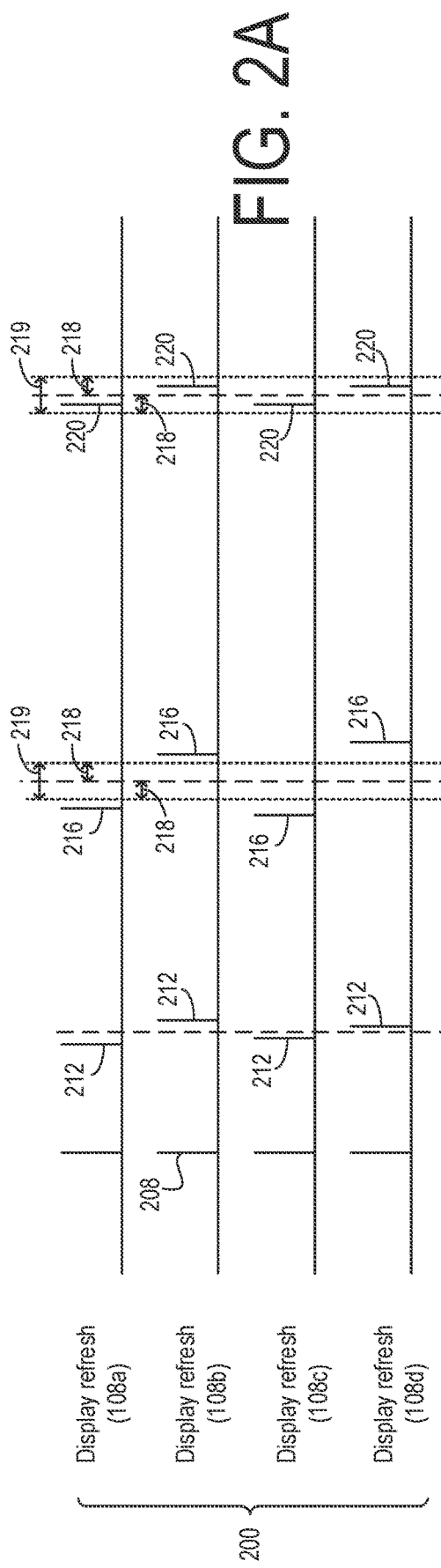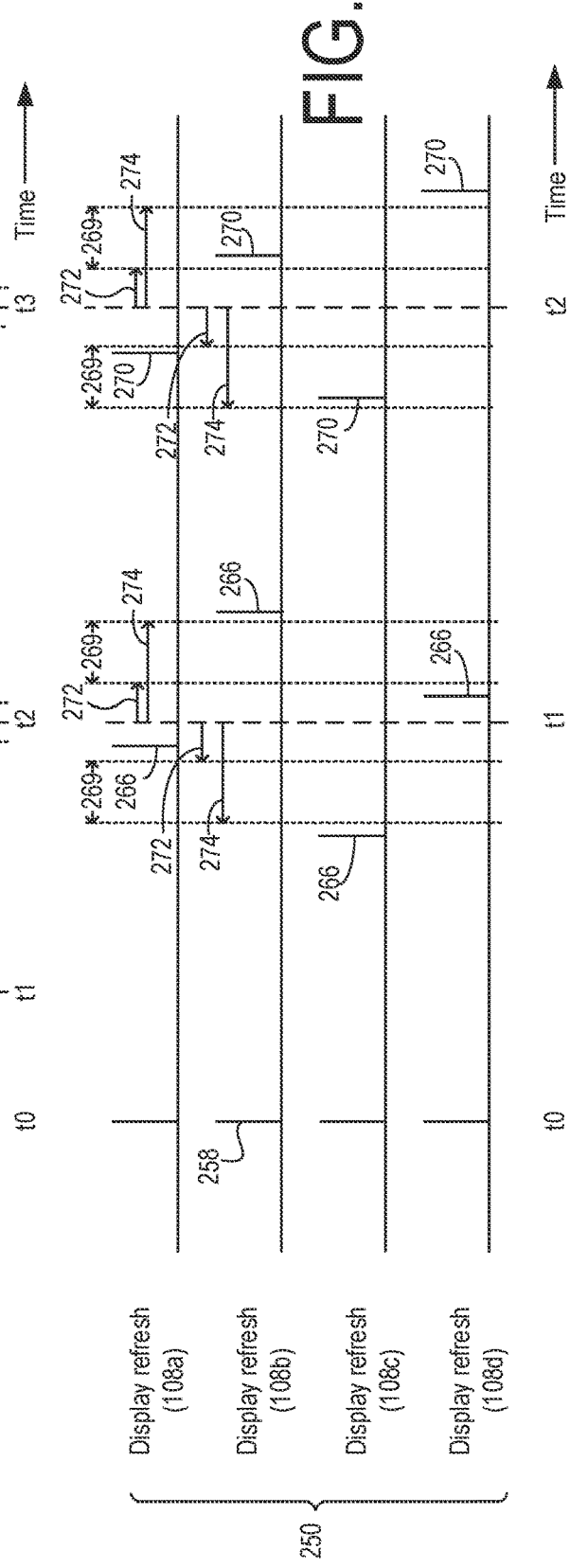

DYNAMIC REFRESH RATES IN MULTI-DISPLAY SYSTEMS

BACKGROUND

Large video displays, such as pro-AV systems used at trade shows, sporting events, or in advertisement signage, can comprise multiple displays, with the individual displays displaying a portion of the content displayed across the multiple displays. If video or other dynamic content is displayed across the multiple displays, synchronizing the rate at which the displays are refreshed can provide for a favorable viewing experience.

BRIEF DESCRIPTION OF THE DRAWINGS

FIGS. 2A-B illustrate example display refresh timings of the display systems of FIG. 1.

DETAILED DESCRIPTION

Figure 1:
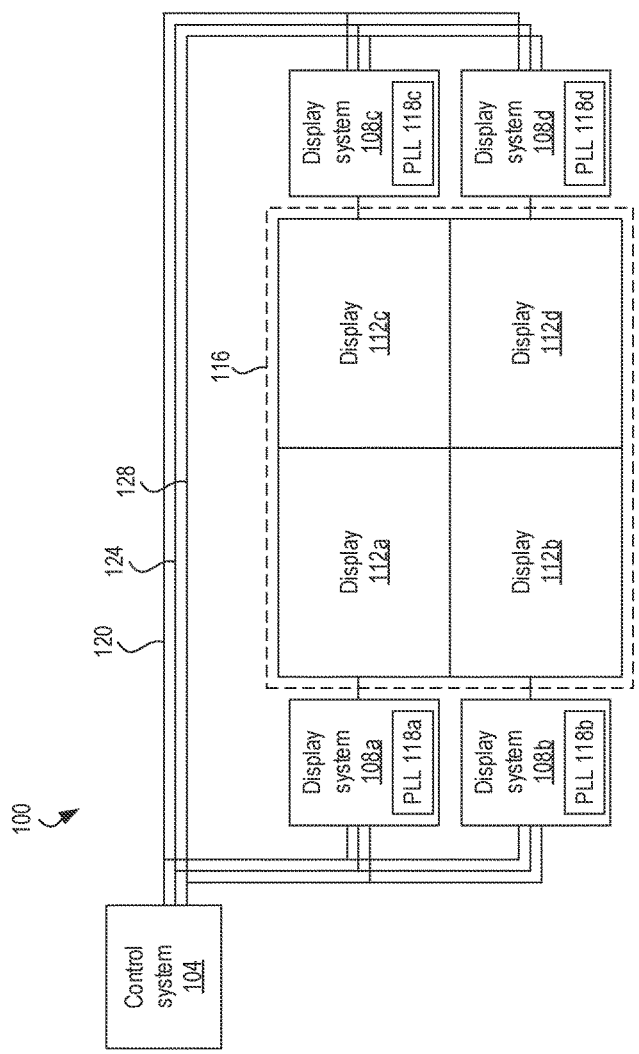
FIG. 1 illustrates an example multi-display system.

The synchronization of video or other dynamic content displayed across multiple displays in a multi-display system is important to provide for a pleasant viewing experience. In some instances, synchronization of computer systems can be accomplished through the use of network synchronization techniques, such as the Network Time Protocol (NTP) or a Precision Time Protocol (PTP) (such as the Institute of Electrical and Electronics Engineers (IEEE) 802.1AS-2011 standard and its extensions). However, computing systems that are network-synchronized and configured to refresh their display at the same rate (e.g., 60 fps (frames per second), 90 fps) can still experience drift in their display refresh rates over time due to phase-locked loop (PLL)-induced drift in the frequency of the clock used by display refresh circuitry. If left uncorrected, display refresh rates can drift enough across display systems in a multi-display system to degrade the viewing experience. For example, a viewer may be able to notice the difference in refresh rates between individual displays, and the difference in display refresh rates can introduce display artifacts, such as tearing or a display going blank.

In one existing approach of varying a display's refresh rate, the Adaptive-Sync feature of DisplayPort (DP) and embedded DisplayPort (eDP) (introduced in DP v1.2a and included in eDP since its introduction) enables a display's refresh rate to be matched to a graphics processing unit's (GPU's) rendering rate on a frame-by-frame basis. However, this approach can require support in both the display and the computing system driving the display, only supports the DP and eDP standards (and not widely used video compression standards such as H.264), and does not support adjusting display refresh rates across multiple computing systems.

Described herein are technologies that adjust the clock utilized by the display refresh circuitry in the individual computing systems (display systems) that drive individual displays in a multi-display system to limit the amount of drift between display refresh times across the individual displays. To keep the displays in a multi-display system synchronized, a control computing system (control system) periodically requests a display refresh timestamp from the individual display systems. One of the display systems is a reference display system and if the difference between the display refresh timestamp of the reference display (reference display refresh timestamp) and that of one of the other display systems is large enough, clock adjustment information is determined and sent to the display system that is out of synchronization. The clock adjustment information can comprise information that is written to control registers of a phased-lock loop (PLL) that generates the clock signal for the display system (or the clock signal utilized by display refresh circuitry if the display system has more than one internal clock signal) at the display system that is out of synchronization.

In the following description, specific details are set forth, but embodiments of the technologies described herein may be practiced without these specific details. Well-known circuits, structures, and techniques have not been shown in detail to avoid obscuring an understanding of this description. Phrases such as "an embodiment," "various embodiments," "some embodiments," and the like may include features, structures, or characteristics, but not every embodiment necessarily includes the particular features, structures, or characteristics.

Some embodiments may have some, all, or none of the features described for other embodiments. "First," "second," "third," and the like describe a common object and indicate different instances of like objects being referred to. Such adjectives do not imply objects so described must be in a given sequence, either temporally or spatially, in ranking, or any other manner. "Connected" may indicate elements are in direct physical or electrical contact with each other and "coupled" may indicate elements co-operate or interact with each other, but they may or may not be in direct physical or electrical contact. Furthermore, the terms "comprising," "including," "having," and the like, as used with respect to embodiments of the present disclosure, are synonymous. Values modified by the word "substantially" include values that vary +/−10% of the unmodified value. As used herein, the term "about" in reference to a value of a feature (e.g., height, width, spacing, time) or upper and lower limits of a range of values for a feature includes features values that are within several percent of the stated feature value, feature value lower range limit, or feature value upper range limit.

Reference is now made to the drawings, which are not necessarily drawn to scale, wherein similar or same numbers may be used to designate same or similar parts in different figures. The use of similar or same numbers in different figures does not mean all figures including similar or same numbers constitute a single or same embodiment. Like numerals having different letter suffixes may represent different instances of similar components. The drawings illustrate generally, by way of example, but not by way of limitation, various embodiments discussed in the present document.

In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims As used herein, the terms "operating", "executing", or "running" as they pertain to software or firmware in relation to a system, device, platform, or resource are used interchangeably and can refer to software or firmware stored in one or more computer-readable storage media accessible by the system, device, platform or resource, even though the software or firmware instructions are not actively being executed by the system, device, platform, or resource. Software and firmware may be embodied as instructions and/or data stored on non-transitory computer-readable storage media.

FIG. 1 illustrates an example multi-display system. The system 100 comprises a control computing system (control system) 104 and a plurality of display computing systems (display systems) 108a-d that drive a plurality of displays 112a-b forming a multi-display display 116. An individual display system 108 causes content to be displayed (drives) at one of the displays 112. The individual display systems 108 comprise a phase-locked loop (PLL) 118, with a PLL generating a clock signal used by the display refresh circuitry of a display system 108. The control system 104 can render and encode frames to be displayed at the multi-display display 116, and streams the frames to the displays 112a-d in the form of content information representing the content to be displayed at the displays 112a-d. The control system 104 can be remote or local to the display systems 108a-d and the displays 112a-d.

The system 100 can reflect a topology in which a high-performance control system 104 renders high-resolution content on the fly for display at the multi-display display 116, the control system 104 being a high-performance computing system with respect to the displays 112a-d. For example, the control system 104 can be a high-performance server and the display systems 108a-d can be Intel® NUCs (Next Units of Computing).

The display systems 108a-d are of the same computing system type. That is, the same processing units (e.g., GPU, central processing unit (CPU)) and the same hardware and software platforms are used in the individual display systems 108a-d. In other embodiments, the computing type can vary across the display systems 108a-d. That is, the display systems 108a-d may comprise different processing units, hardware platform components, and/or software platform components.

Although the system 100 comprises a control system 104 separate from the display systems 108a-d, in other embodiments, one of the display systems can be the control system. That is, the control system drives one of the displays in the multi-display system in addition to monitoring and correcting for display refresh drift in the display systems. In embodiments where the control system is one of the display systems, the control system can have processing capabilities greater than those of the display system. For example, a control system that is also a display system and that is responsible for the rendering, encoding, and streaming of 8K or 16K video at 60 fps (frames per second) to a video wall comprising a large number of displays, possess more graphics computing power than the other display systems. In other embodiments where the control system is also one of the display systems, the control system and the display systems can be the same type of computing system with the same processing capabilities.

The system 100 further comprises data channel 120, clock channel 124, and control channel 128, which allow for communication between the control system 104 and the display systems 108a-d. The channels 120, 124, and 128 can comprise one or more wired or wireless connections and can utilize any suitable communication protocol or technology. Content is provided by the control system 104 to the display systems 108a-d via the data channel 120. The content can be static or dynamic content and can be previously rendered or rendered on the fly by the control system 104. In some embodiments, the data channel 120 utilizes the Real-time Transport Protocol (RTP) to provide content information to display systems 108a-d. The clock channel 124 utilizes a network synchronization protocol to synchronize the display systems 108a-d. In some embodiments, the clock channel 124 can be part of an NTP implementation. In other embodiments, the clock channel 124 can comprise an Ethernet connection and be part of an implementation of the IEEE 802.11AS-2011 PTP standard or part of an implementation of any version of the IEEE 1588 PTP protocol. The control channel 128 delivers clock adjustment information and display refresh timestamp requests from the control system 104 to the display systems 108a-d and delivers display refresh timestamps from the display systems 108a-d to the control system 104.

In other embodiments, fewer or more channels than those shown in FIG. 1 can be used to deliver content from the control system 104 to the display systems 108a-d, to keep the display systems 108a-d in synchronization, and to deliver display refresh rate timestamp requests and clock adjustment information. In addition, different information can be passed over different channels than indicated above. For example, in some embodiments, display refresh timestamps can be sent by the display systems 108a-d over the clock channel 124.

Although a multi-display display 116 is shown in FIG. 1 as having four displays, in other embodiments, the multi-display display 116 can comprise any other number of displays (e.g., 2, 16, 32, 100).

FIGS. 2A-2B illustrates example display refresh timings of the display systems of FIG. 1. Timings 200 and 250 comprise display refresh timings for the display systems 108a-d, a spike (e.g., spikes 208, 258) in the timings 200 and 250 indicate the start of a display refresh cycle. FIG. 2A illustrates timings 200 in which display refresh drift is kept within a drift threshold value of the time at which display refreshes of the display systems are to start in the absence of display refresh drift. At a time t0 before the start of content being displayed at the multi-display display 116, the display systems 108a-d are synchronized. As previously discussed, the displays systems 108a-d can be synchronized through the use of a network synchronization protocol such as NTP or PTP. In some embodiments, this initial synchronization of the display systems can utilize a high precision modeset of a network synchronization protocol, if such a modeset is available. Synchronization of the display systems 108a-d can comprise setting a clock counter (e.g., a counter that counts the number of elapsed clock cycles) to the same value and setting phase-locked loop (PLL) dividers to the same value across display systems. Once the clocks of display systems are synchronized, the individual display systems can cause a display refresh to occur at periodic intervals depending on the frame rate of the content being displays (e.g., one-sixtieth of a second for content displayed at 60 fps, one-thirtieth of a second for 30 fps). The rate at which the content is to be displayed at the display systems can be provided by the control system. However, as previously discussed, even with display system clocks synchronized and display systems instructed to display content at the same rate, display refresh times of a display system can drift relative to other display systems over time.

After content has begun to be displayed at the displays 112a-d, a display refresh is to start at time t1. The time t1 represents the start of a display refresh at the display systems 108a-d with no display refresh drift. However, due to clock frequency drift at the display systems 108a-d, the start of display refreshes 212 are offset from the time that the display refresh was to start. As can be seen, the start of a display refresh can drift such that the start of a display refresh occurs sooner or later relative to the start of a display refresh of another display system. This can cause the displays in the multi-display system to become unsynchronized to the point that it results in a degraded viewing experience, as discussed above.

The time t2 represents the start of a display refresh at a time after t1 if there were no display refresh drift in the display systems. The start of display refreshes 216 illustrate that the amount of drift has increased for the individual display systems relative to the amount of drift at time t1. The control system determines that the amount of drift at the start of the display refreshes 216 exceeds a drift threshold value 218 for the individual displays. As a result, the clock for the individual display systems 108a-d is adjusted to reduce the amount of drift, as will be described below. At a time t3, which represents the start of a display refresh at a time after t2 if there were no drift, due to the clocks of the display systems 108a-d being adjusted after time t2, the amount of display refresh drift has been reduced and the start of the display refreshes 220 are within a drift threshold window 219, which has a width twice that of the drift threshold value 218.

FIG. 2B illustrates timings 250 in which display refresh drift of the display systems is kept within a drift threshold window. At a time t0, the display systems are synchronized and at time t1, a time at which display refreshes are to start if there were no drift, the starts of the display refresh 212 have begun to drift. At time t1, a time after t0 at which display refreshes are to start if there was no drift, the start of the display refreshes 266 have begun to drift from t1 and are outside of drift threshold windows 269 defined by a lower drift threshold value 272 and an upper drift threshold value 274.

The control system determines that the amount of drift at the start of the display refreshes 266 is outside the drift threshold windows 269 (e.g., greater than an upper drift threshold value 274 or less than a lower drift threshold value 272) for the individual displays. As a result, the clock for the individual display systems 108a-d is adjusted so that the drift falls within the drift threshold window 269, as will be described below. At a time t2, which represents the start of a display refresh at a time after t1 if there were no drift, due to the clocks of the display systems 108a-d being adjusted after time t1, the display refresh drifts have been adjusted such that the start of the display refreshes 270 are within the drift threshold window 269.

Although the drift of the display refresh systems have been discussed in reference to times at which display refreshes were to start if there were no drift (e.g., times t1, t2, t3), in other embodiments, and as will be described below, the drift can be calculated with respect to reference display refresh timestamps of a reference display system.

Figure 3:
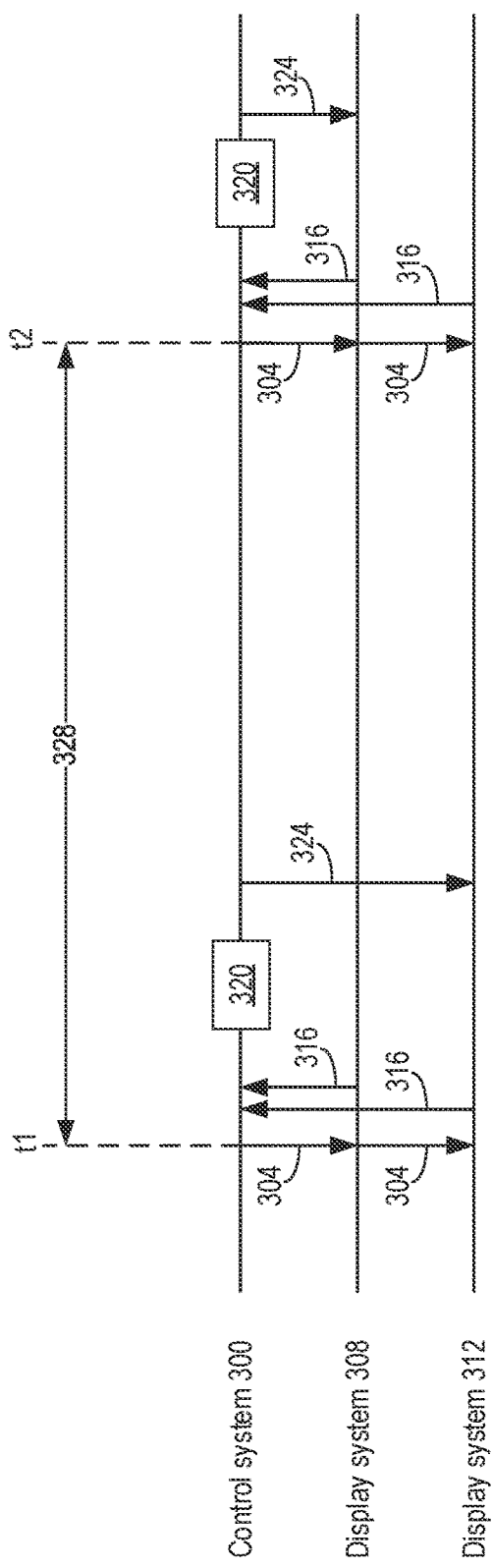
FIG. 3 illustrates a simplified data flow between a control system and display systems in a multi-display system to reduce display system clock drift.

FIG. 3 illustrates a simplified data flow between a control system and display systems in a multi-display system to reduce display refresh drift. At a time t1 after the control system 300 has begun providing content information to the display systems 308 and 312, the control system 300 sends display refresh timestamp requests 304 to the display systems 308 and 312. The control system 300 sends timestamp requests 304 at periodic intervals. The time interval 328 between the timestamp requests 304 can be any time interval (e.g., every 15 seconds, 30 seconds, 1 minute, 2 minutes). The time interval 328 can be static or dynamic. In the latter case, the control system 300 can adjust the time interval 328 based on, for example, how often display systems are determined to have display refresh drift beyond a drift threshold value or outside of a drift threshold window. In one example, the time interval 328 can be increased if no display system has experienced display refresh drift greater than the drift threshold or outside of a drift threshold window value for N (N=1, 2, 3 . . . ) consecutive intervals 328. In another example, the time interval 328 can be decreased if one or more display systems are determined to have drift greater than the drift threshold value or outside of a drift threshold window for N consecutive intervals. In other embodiments, the time interval 328 can be determined by the control system 300 based on the number of display systems in the multi-display system, with timestamp requests 304 can first be sent after a time interval 328 after the start of content information being provided to the display systems 308 and 312 or at another interval.

In response to receiving the display refresh timestamp requests 304, the display systems 308 and 312 send display refresh timestamps 316 of recent display refreshes to the control system 300. Block 320 represents the time spent by the control system 300 determining the amount of display refresh drift for the individual display systems and determining clock adjustment information to be sent to display systems experiencing display refresh drift exceeding a drift threshold value or outside of a drift threshold window. Determining a drift amount and clock adjustment information are discussed in greater detail below. The control system 300 sends clock adjustment information 324 to the display systems determined to be experiencing enough drift to warrant having their clocks adjusted. As illustrated in FIG. 3, clock adjustment information may not be sent to every display system every time the control system 300 checks display refresh drift for the display systems. For example, FIG. 3 illustrates clock adjustment information 324 being provided to display system 312 based on the display refresh timestamps collected by the control system 300 at time t0 and clock adjustment information 324 being provided to display system 308 based on the display refresh timestamps collected by the control system 300 at time t2.

A control system can determine the amount of display refresh drift and cause display system clocks to be adjusted as follows. During the provision of content information to the display systems, the control system periodically (or aperiodically) provides display refresh timestamp requests to the display systems. In response, the display systems provide a timestamp of a recent display refresh to the control system. A display system can generate a display refresh timestamp as part of a display being refreshed and store the timestamp at the display system (in a register, memory, storage, etc.). In some embodiments, a display refresh timestamp can be generated and stored by an interrupt request handler invoked to perform the display refresh or invoked as part of the display refresh process.

In response to receipt of the display refresh timestamps from the display systems, the control system determines an amount of display refresh drift for the individual display systems. The display refresh drift can be the difference between the display refresh timestamp for a display system and a reference display refresh timestamp. The reference display refresh timestamp is the display refresh timestamp for a reference display system, which can be any display system of a multi-display system. In embodiments where the control system is one of the display systems, the control system can be the reference display system.

In some embodiments, the control system generates clock adjustment information for the display system if the display refresh drift for a display system exceeds a drift threshold value. In embodiments where drift is calculated with respect to a reference display refresh value, clock adjustment information is calculated if an absolute difference between the display refresh timestamp for a display and the reference display refresh timestamp is greater than the drift threshold value. If the absolute difference is greater than the drift threshold value and the display refresh timestamp is greater than the reference display refresh timestamp, the clock adjustment information, when utilized by the display refreshing experiencing drift, is to cause the frequency of the clock of the display system utilized by the display refresh circuitry to increase. If the absolute difference is greater than the drift threshold value and the display refresh timestamp is less than the reference display refresh timestamp, the clock adjustment information, when utilized by the display refreshing experiencing drift, is to cause the frequency of the clock of the display system utilized by the display refresh circuitry to decrease.

The drift threshold value can be about equal to a display refresh time interval based on a frame rate at which content is being displayed at the displays of a multi-display system. That is, the drift threshold value can be, for example, about 16 ms for content being displayed at 60 fps and about 11 ms for content being displayed at 90 ms. Keeping display refresh drift within the time period between display refreshes can prevent a display system from falling behind or speeding ahead a reference display system by one frame. A display system that has drifted one frame ahead or behind a reference display system would either need to drop a frame or repeat the display of a frame, respectively.

In some embodiments, the control system generates clock adjustment information for the display system if the drift for a display system falls outside of a drift threshold window. That is, the control system generates clock adjustment information if the drift is below a lower drift threshold value or exceeds a drift threshold value. In embodiments where drift is calculated with respect to a reference display refresh value, clock adjustment information is determined if an absolute difference between the display refresh timestamp for a display and the reference display refresh timestamp is greater than the upper drift threshold value or less than the lower drift threshold value. If the absolute difference is greater than the upper drift threshold value and the display refresh timestamp is greater than the reference display refresh timestamp, the clock adjustment information, when utilized by the display refreshing experiencing drift, is to cause the frequency of the clock of the display system utilized by the display refresh circuitry to increase. If the absolute difference is greater than the upper drift threshold value and the display refresh timestamp is less than the reference display refresh timestamp, the clock adjustment information, when utilized by the display refreshing experiencing drift, is to cause the frequency of the clock of the display system utilized by the display refresh circuitry to decrease.

If the absolute difference between the display refresh timestamp and the reference display refresh timestamp is less than the lower drift threshold value and the display refresh timestamp is greater than the reference display refresh timestamp, the clock adjustment information, when utilized by the display refreshing experiencing drift, is to cause the frequency of the clock of the display system utilized by the display refresh circuitry to decrease. If the absolute difference is less than the lower drift threshold value and the display refresh timestamp is less than the reference display refresh timestamp, the clock adjustment information, when utilized by the display refreshing experiencing drift, is to cause the frequency of the clock of the display system utilized by the display refresh circuitry to increase.

The upper drift threshold value can be about equal to a display refresh time interval for a frame rate associated with the content being displayed at the displays of a multi-display system, as described above, and the lower drift threshold value can be about equal to one-half the display refresh time interval. Thus, the lower and upper drift threshold values can be about 8 ms and 16 ms for content being displayed at 60 fps and about 6 ms and 11 ms for content being displayed at 90 fps.

In some embodiments, the display threshold value can be static and in other embodiments, the display threshold value can be dynamic and be based on the frame rate that content is being displayed at the displays. Other values for the drift threshold value, the lower drift threshold value, and the upper drift threshold value than those stated above can be used. Setting the drift threshold value to a non-zero value can be advantageous to avoid continual adjustment of display system clocks. For example, in some embodiments, the drift threshold value can be about 2 ms. Further, in some embodiments, the drift of a display system can be kept within 2 ms of a drift threshold value, an upper drift threshold value, or a lower drift threshold value.

Figure 4:
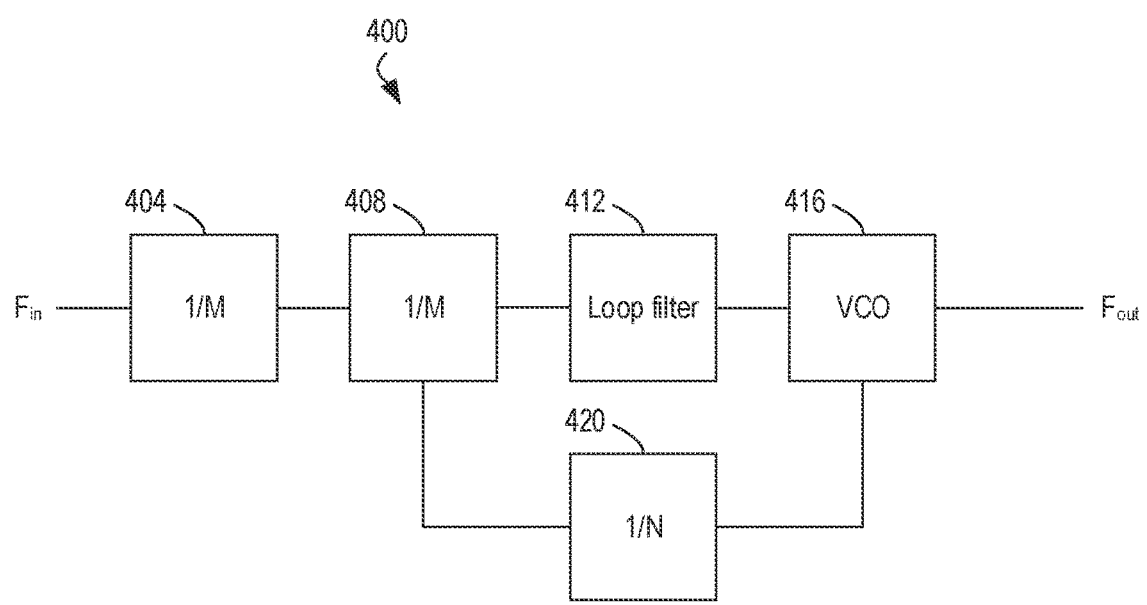
FIG. 4 illustrates an example phase-locked loop.

In some embodiments, the clock adjustment information can be phase-locked loop adjustment information that can be used by a display system to adjust a phase-locked loop of the display system used that generates the clock signal utilized by the display system display refresh circuitry. In some embodiments, the phase-locked loop adjustment information can be phase-locked loop register information that the display system writes to phase-locked loop control registers. In some embodiments, the phase-locked loop register information can be used to adjust a PLL reference divider factor and/or a PLL feedback divider factor (see FIG. 4, which, for reference, illustrates an example phase-locked loop 400 comprising a reference divider 404, a phase detector 408, a loop filter 412, and a voltage-controlled oscillator (VCO)) 416 in which an input signal $F_{in}$ is divided by a reference divider factor M and the output signal $F_{out}$ is divided by a feedback divider factor N by a feedback divider 420 to generate a feedback signal provided to the phase detector 408).

Clock adjustment information, when utilized by a display system, can reduce the amount of display refresh drift of the display system. That is, if display refreshes are starting later relative to the start of the display refreshes at the reference display system, the clock adjustment information, when utilized by the display system, can cause the display refreshes to occur sooner by increasing the display system clock frequency. Similarly, if display refreshes at a display system are starting earlier than the display refreshes of the reference display system, the clock adjustment information, when utilized by the display system, can cause the display refreshes to occur later by decreasing the display system clock frequency.

Clock adjustment information can be determined using various approaches. For example, in some embodiments, the clock adjustment information can be based on the difference between the display refresh timestamps of the display system and the reference display system. In other embodiments, the control system can use a PID (proportional-integral-derivative) control algorithm to determine the clock adjustment information.

Figure 5:
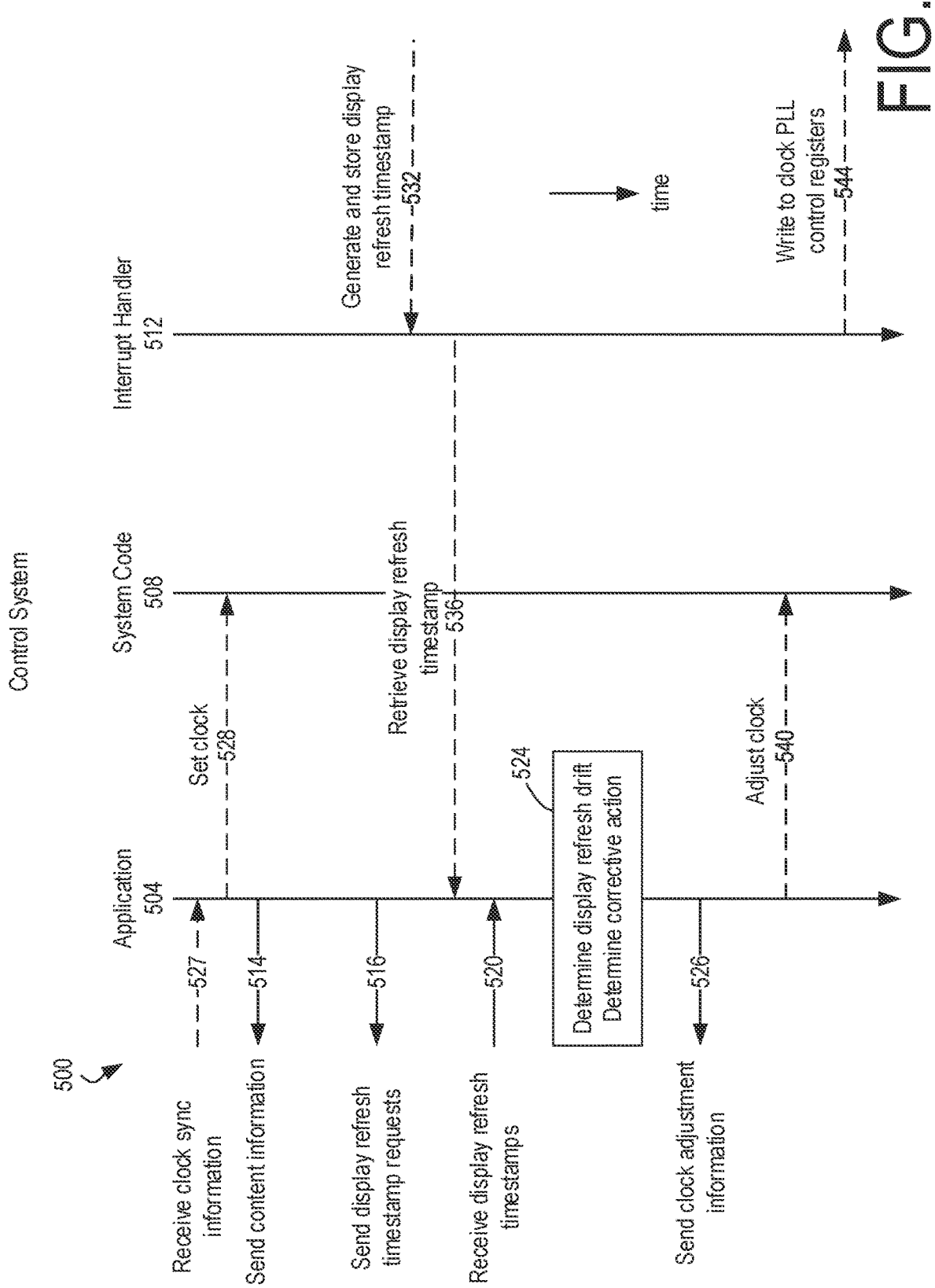
FIGS. 5 and 6 illustrate example flow diagrams for a control system and a display system in a multi-display system, respectively.
Figure 6:
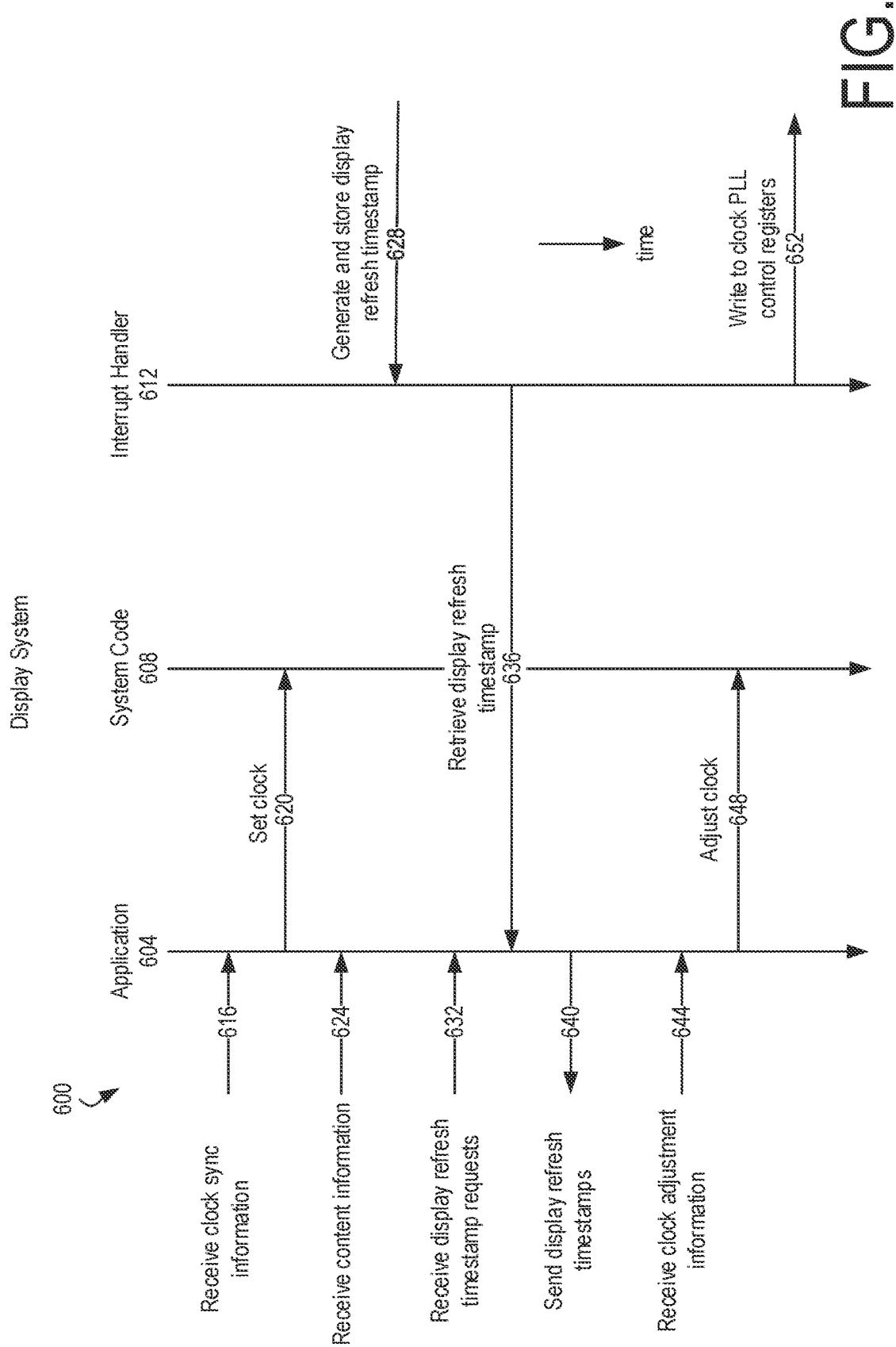

FIGS. 5 and 6 illustrate example flow diagrams for a control system and a display system in a multi-display system, respectively. Flow diagram 500 illustrates actions taken by and data flowing to/from an application 504, system code 508, and an interrupt handler 512 operating at a control system. The application 504 is an application operating in user space that monitors the amount of display refresh drift between display systems in a multi-display system and determines clock adjustment information to be sent to the display systems, if necessary. In some embodiments, the tasks performed by application 504 are performed by an operation system (e.g., an operating system daemon). In some embodiments, the system code 508 and the interrupt handler 512 are components of an operating system kernel. In some embodiments, the system code 508 can be invoked by an ioctl (input/output control) system call by the application 504 and the system code 508 can cause an interrupt that is handled by the interrupt handler 512. The interrupt created by the system code 508 can depend on the ioctl request code provided by the application 504 in the ioctl call.

The control system begins sending content information to display systems at 514. As discussed above, to collect display refresh timestamps from the display systems, the application 504 sends display refresh timestamp requests at 516 and receives display refresh timestamps from the display systems in response at 520. At 524, the application 504 determines an amount of display refresh drift for the individual displays and determines clock adjustment information to be sent to individual display systems to reduce display refresh drift, if needed. The control system sends the clock adjustment information to the display systems at 526.

Flow diagram 600 illustrates actions taken by and data flowing to and from an application 604, system code 608, and an interrupt handler 612. The system code 608 and the interrupt handler 612 can be similar entities as the system code 508 and the interrupt handler 512 operating on the control system. Prior to receiving content information from the control system, the display system receives clock synchronization information at 616. The clock synchronization information is used to synchronize clocks of display systems that belong to the multi-display system. As discussed above, the clock synchronization information can be information that is part of an NTP or PTP implementation. The clock synchronization information can be any information that can be used by a display system to adjust the clock of the display system utilized by the display refresh circuitry of the display system. For example, the clock synchronization information can comprise a counter value and one or more PLL divider values. The counter value can be used to set a clock counter that counts a number of elapsed clock cycles of a display system clock and the one or more PLL divider values can be used to configure a PLL used to generate the display system clock.

To set the display system clock, the application 604 calls system code 608 to set the clock at 620. In some embodiments, the application 604 calls the system code 608 via an iotcl call with a request code indicating that the ioctl call is to set the display system clock using the clock synchronization information received from the control system.

In embodiments where the control system is one of the display systems, the control system can also receive clock synchronization information at 527 (if a system other than the control system is synchronizing the display systems) and call system code 508 to set the control system clock at 528 based on the received clock synchronization information. In some embodiments, the control system controls synchronizing the display systems. That is, the control system generates the clock synchronization information and sends it to the display systems. If the control system is also a display system, the control system calls the system code 508 to set its clock using the clock synchronization information that the display system has generated.

Returning to FIG. 6, the display system receives content information 624 and the interrupt handler 612 generates a display refresh timestamp as display refreshes occur and stores the timestamp at the display system at 628. The display refresh timestamp can be generated and stored every display refresh, every N display refreshes, on a periodic basis (e.g., every 1 second, 10 seconds, 30 seconds), within a period before a display refresh timestamp request is to occur, or on any other basis. In embodiments where display refresh rates are between about 20-120 fps and display refresh timestamp requests are sent at an interval on the order of one minute, the display refresh timestamp sent to the control system is likely for a display refresh that has occurred since the last display refreshment timestamp request was received at the display system. In some embodiments, the display refresh timestamp provided to the control system can be a timestamp associated with the display refresh most recently performed by the display computing system. The display refresh timestamp can indicate the start of a display refresh or another time of a display refresh cycle (e.g., completion of a display refresh). To allow for the minimization of display refresh drift, the display refresh timestamps generated and stored at the individual display systems are to indicate the same point within the display refresh (e.g., start of the refresh) across the individual display systems. In other embodiments, a component of the display system other than the interrupt handler 612 generates and stores the display refresh timestamp, such as another component of the operating system. If the control system is a display system, the control system generates and stores display refresh timestamps (control system display refresh timestamp) at 532.

The display system receives the display refresh timestamp request from the control system at 632, retrieves the stored display refresh timestamp captured at 636, and sends the display refresh timestamp to the control system at 640. If the control system is a display system, the control system retrieves the display refresh timestamp of the control system at 536 for use in determining display refresh drift of the display systems (if the control system is the reference display system) or of the control system (if a display system other than the control system is the reference display system).

The display system receives clock adjustment information at 644 if the control system has determined that the amount of display refresh drift of the display system has exceeded a drift threshold value. In response, the application 604 calls the system code 608 to update the display system clock at 648. In some embodiments, the application 604 calls the system code 608 via an ioctl call with a request code indicating that the ioctl call is to adjust the display system clock utilized by the display refresh circuitry based on the clock adjustment information. In the embodiment illustrated in FIGS. 5 and 6, the display system clocks are generated by a PLL and as part of adjusting the display system clock, the system code 608 creates an interrupt that causes the interrupt handler 612 to write the clock adjustment information to one or more PLL control registers at 652. If the control system is a display system and a display system other than the control system is the reference display system, the application 504 calls the system code 508 to adjust the control system clock at 540 based on clock adjustment information determined by the control system and the interrupt handler 512 writes the clock adjustment information (control system clock adjustment information) to control system PLL control registers at 544.

Figure 7:
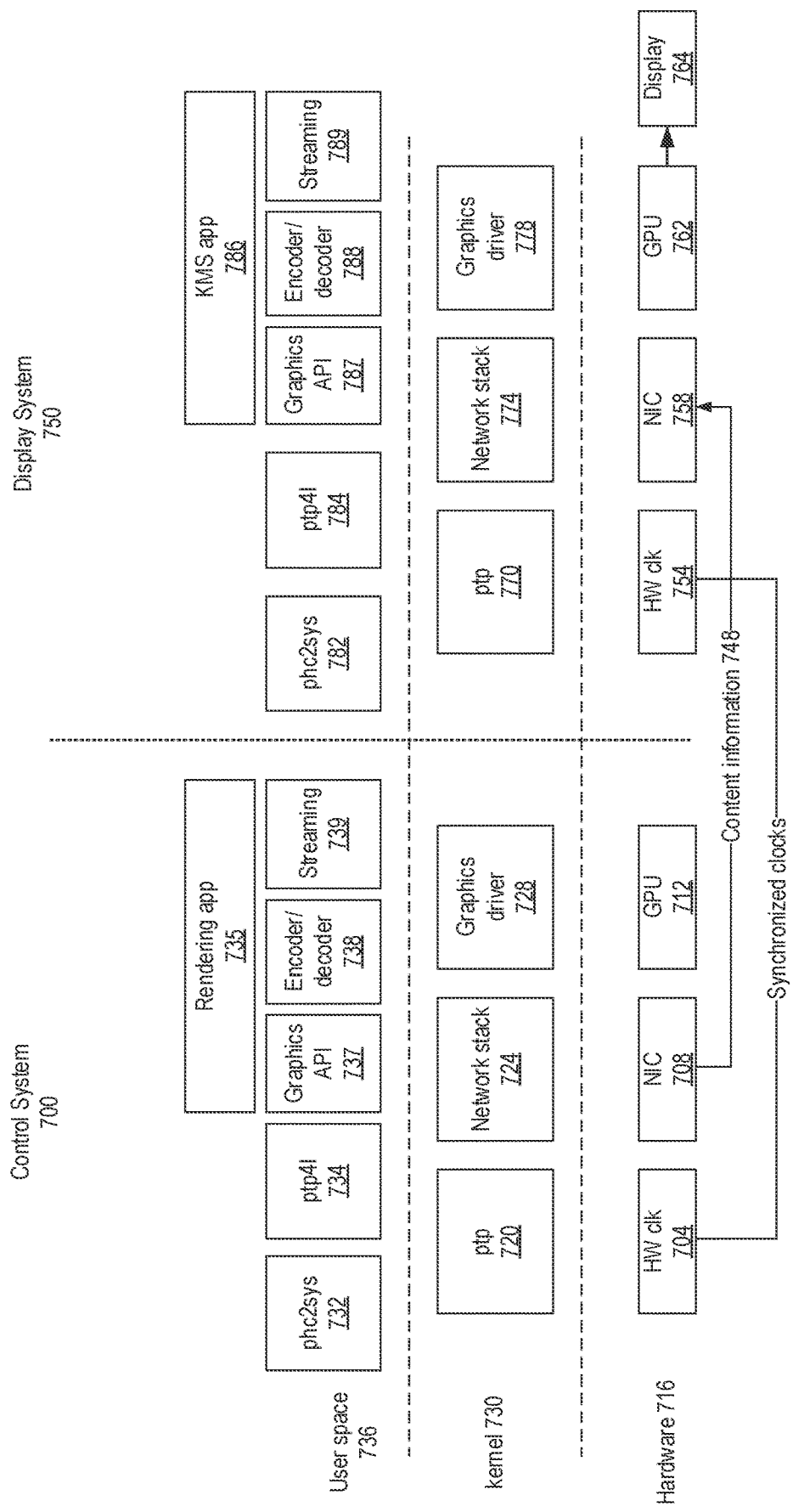
FIG. 7 illustrates example simplified architectures for a control system and a display system of a multi-display system.

FIG. 7 illustrates example simplified architectures for a control system and a display system of a multi-display system. The control system 700 and the display system 750 are running the Linux® operating system and are part of a multi-display system. The architecture of the control system 700 comprises a hardware clock 704, a network interface controller (NIC) 708, and a graphics processing unit (GPU) 712 at a hardware level 716; a ptp block 720, a network stack 724, and a graphics driver 728 in a kernel space 730; and a phc2sys program 732, a ptp41 program 734, a rendering application 735, a graphics API 737, a video encoder/decoder 738, and a streaming application 739 in user space 736. The architecture of the display system 750 is similar to that of the control system 700, with a hardware clock 754, a NIC 758, and a GPU 762 at the hardware level 716, a ptp block 770, a network stack 774, and a graphics driver 778 in the kernel space 730, and a phc2sys program 782, a ptp41 program 784, a kernel mode setting (KMS) application 786, a graphics API 787, a video encoder/decoder 788, and a streaming application 789 in the user space 736.

The phc2sys 732 and ptp41 734 programs and the ptp 720 kernel block of the control system 700 and the phc2sys 782 and ptp41 784 programs and the ptp 770 kernel block of the display system 750 collectively act to synchronize the hardware clocks 704 and 754 via a PTP implementation. The rendering application 735 renders content for display by the multi-display system using a 3D rendering engine of the GPU 712. The graphics API 737 can be a Mesa implementation that implements a graphics API for the GPU 712. The encoder/decoder 738 can be an Intel® MediaSDK embodiment or other suitable encoder/decoder that encodes rendered frames. In some embodiments, the content information can be encoded by the encoder/decoder 738 according to the H.264 video compression standard and using an H.264 encoder of the GPU 712. The streaming application 739 can be a gstreamer embodiment configured to stream content information 748 from the control system to the display system. In some embodiments, a gstreamer implementation can perform the encoding functions of the encoder/decoder 738 and the streaming functions of streaming application 739. In some embodiments, the RTP protocol can be used to deliver content information 748 to the display system 750. The network stack 724 and the NIC 708 are utilized to provide the content information 748 to the display system 750.

The content information 748 is received at the display system 750 by the NIC 758 and delivered to user space applications by the network stack 774. The graphics API 787, the encoder/decoder 788, and the streaming program 789 can be implemented in a similar fashion as the graphic API 737, the encoder/decoder 738, and the streaming application 739 are implemented in the control system 700. For example, the streaming application 739 can receive the streamed content information, the encoder/decoder 788 can decode the content information using a decoder of the GPU 762 (e.g., a H.264 decoder), and the graphics API 737 provides a graphics API for the KMS application 786. The KMS application 786 can cause the content represented by the received content information 748 to be displayed at the display 764. Another user space application (not shown) can receive clock adjustment information and cause the clock adjustment information to be utilized by the display system 750 to adjust the display system clock 754 (e.g., through an ioctl call). The graphics driver 778 writes clock adjustment information to PLL control registers to adjust the display system clock. The GPU 762 comprises a display driver that causes the content represented by the content information 748 to be displayed at the display 764.

If the control system 700 and the display system 750 comprise certain Intel® chipsets and the Linux® operating system comprises a drm (direct rendering manager)/i915 graphics driver, the graphics drivers 728 and 778 can write clock adjustment information to the following PLL control registers to adjust the system clock: PIPE_DATA_M1, PIPE_DATA_N1, PIPE_LINK_M1, and PIPE_LINK_N1. The "LINK" registers control the stream clock (or pixel clock), which controls the rate at which data is sent across the link between the control system 700 and the display system 750, and the "DATA" registers control the amount of data being sent across the link. The "DATA" register values can be a stream clock rate multiplied the number of bytes per pixel in a frame or a pixel clock rate multiplied by the number of lanes comprising in a link between the control and display systems. The "M1" and "N1" registers are associated with the PLL reference divider and feedback divider (see FIG. 4), respectively. In such embodiments, adjusting the values of these PLL registers adjusts the rate at which display refreshes occur at the display system.

It is to be understood that FIG. 7 illustrates one example of a set of elements (e.g., applications, programs, blocks, and/or modules) that can be included in a computing device. In other embodiments, a control device or display device can have more or fewer modules than those shown in FIG. 7. Further, separate elements can be combined into a single element, and a single element can be split into multiple elements. Moreover, any of the elements shown in the user space 736 or the kernel space 730 can be part of an operating system or a hypervisor of a control system or display system, one or more software applications independent of the operating system or hypervisor, or operate at another software layer.

The elements shown in FIG. 7 can be implemented in software, hardware, firmware or combinations thereof. A computing system referred to as being programmed to perform a method can be programmed to perform the method via software, hardware, firmware or combinations thereof.

Figure 8:
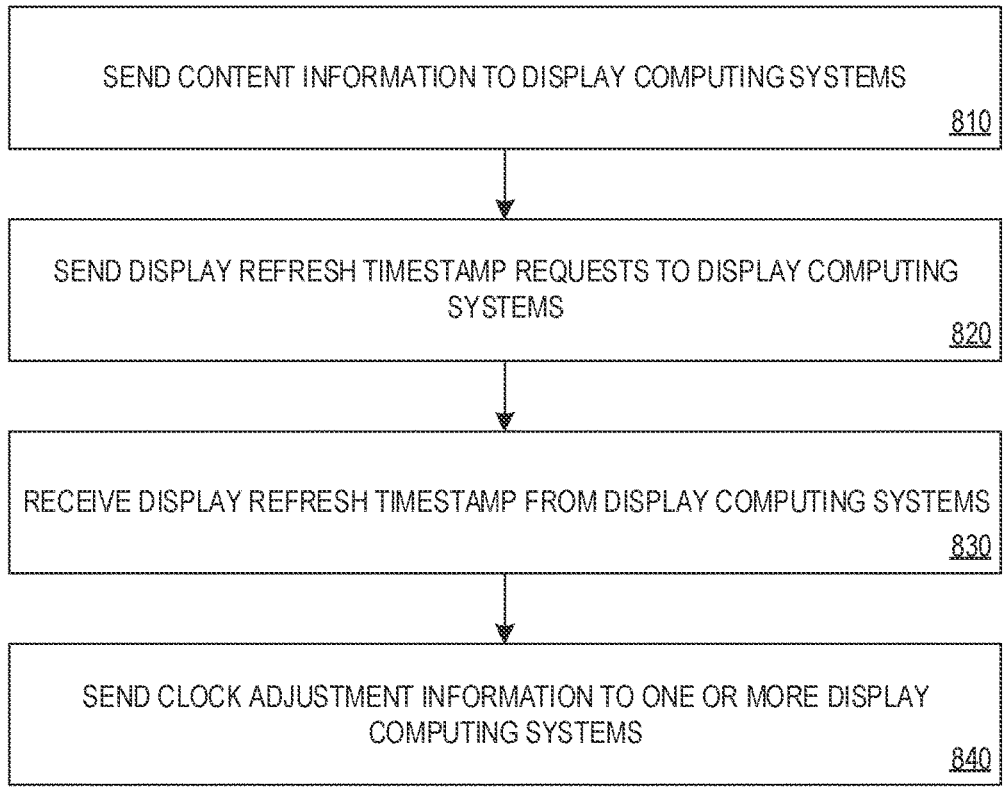
FIG. 8 is a flowchart of a first example method for controlling display refresh drift in a multi-display system.

FIG. 8 is a flowchart of a first example method for controlling display refresh drift in a multi-display system. The method 800 can be performed by, for example, a control system in a video wall. At 810, content information is sent to a plurality of display computing systems, the content information representing content to be displayed at a plurality of displays controlled by the display computing systems. At 820, display refresh timestamp requests are sent to the plurality of display computing systems. At 830, a display refresh timestamp is received from individual of the display computing systems. At 840, clock adjustment information is sent to one or more of the display computing systems, the clock adjustment information sent to an individual display computing system based on the display refresh timestamp received from the individual secondary display system.

In other embodiments, the method 800 can comprise one or more additional elements. For example, the method 800 can further comprise, for individual of the one or more of the display computing systems, determining the clock adjustment information based on the display refresh timestamp of the individual display computing system.

Figure 9:
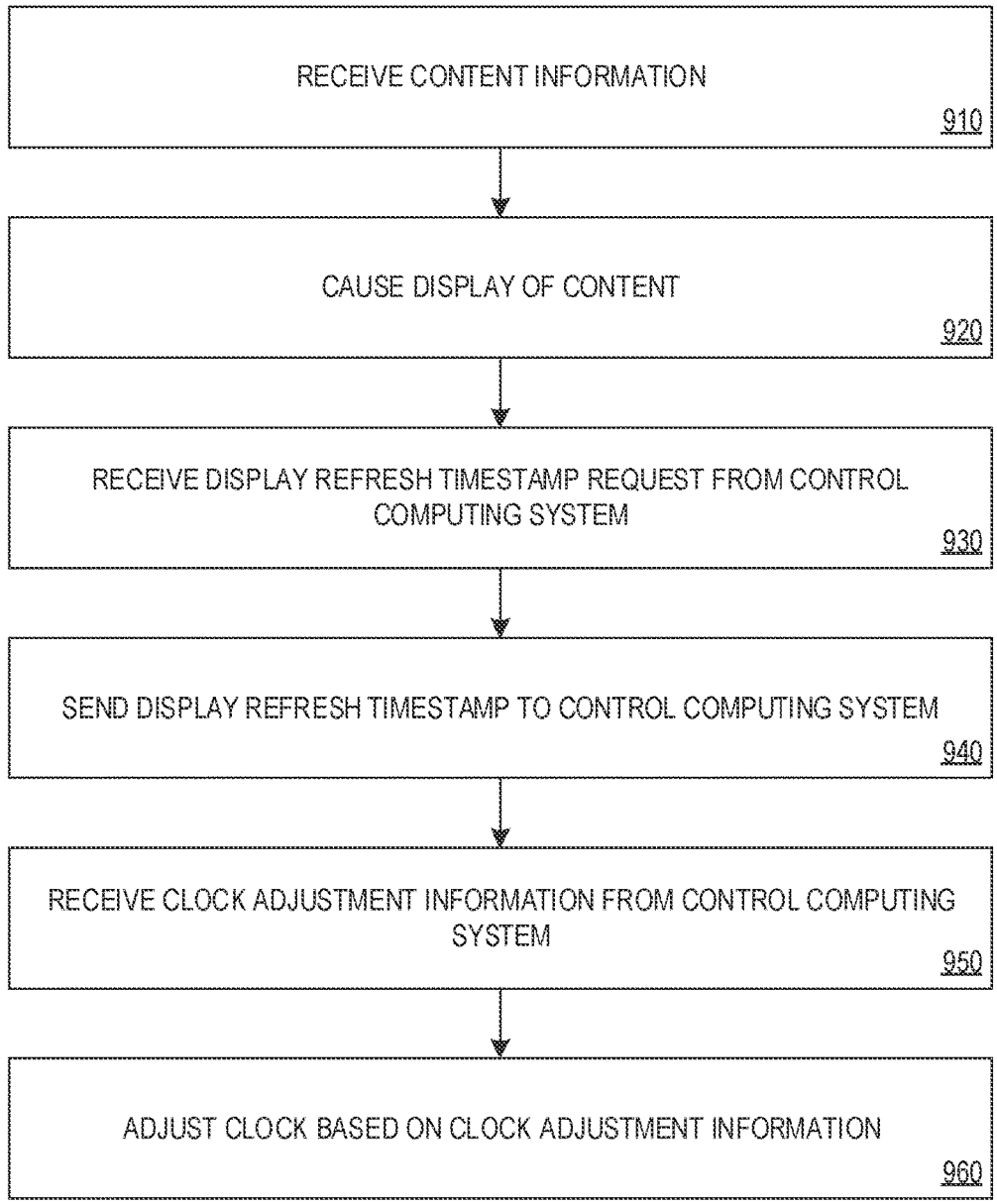
FIG. 9 is a flowchart of a second example method for controlling display refresh drift in a multi-display system.

FIG. 9 is a flowchart of a second example method for controlling display refresh drift in a multi-display system. The method 900 can be performed by, for example, one of the display systems in a video wall. At 910, content information is received at a display computing system, the content information representing content to be displayed at a display controlled by the display computing system. At 920, the content is caused to be displayed at the display. At 930, at a display computing system, a display refresh timestamp request is received from a control computing system. At 940, a display refresh timestamp is sent from the display computing system to the control computing system. At 950, clock adjustment information is received from the control computing system. At 960, a clock of the display computing system is adjusted based on the clock adjustment information.

In other embodiments, the method 900 can comprise one or more additional elements. For example, the method 900 can further comprise, sending clock synchronization information to the display computing systems prior to sending content information to the display computing systems.

The technologies described herein can be performed by or implemented in any of a variety of computing systems, including mobile computing systems (e.g., smartphones, handheld computers, tablet computers, laptop computers, portable gaming consoles, 2-in-1 convertible computers, portable all-in-one computers), non-mobile computing systems (e.g., multi-display systems (e.g., "video walls"), desktop computers, next-level of computing small form-factor computer kits (e.g., Intel® NUCs), servers, workstations, stationary gaming consoles, set-top boxes, smart televisions, rack-level computing solutions (e.g., blade, tray, or sled computing systems)), and embedded computing systems (e.g., computing systems that are part of a vehicle, smart home appliance, consumer electronics product or equipment, manufacturing equipment). As used herein, the term "computing system" includes computing devices and includes systems comprising multiple discrete physical components. In some embodiments, the computing systems are located in a data center, such as an enterprise data center (e.g., a data center owned and operated by a company and typically located on company premises), managed services data center (e.g., a data center managed by a third party on behalf of a company), a colocated data center (e.g., a data center in which data center infrastructure is provided by the data center host and a company provides and manages their own data center components (servers, etc.)), cloud data center (e.g., a data center operated by a cloud services provider that host companies applications and data), and an edge data center (e.g., a data center, typically having a smaller footprint than other data center types, located close to the geographic area that it serves).

Figure 10:
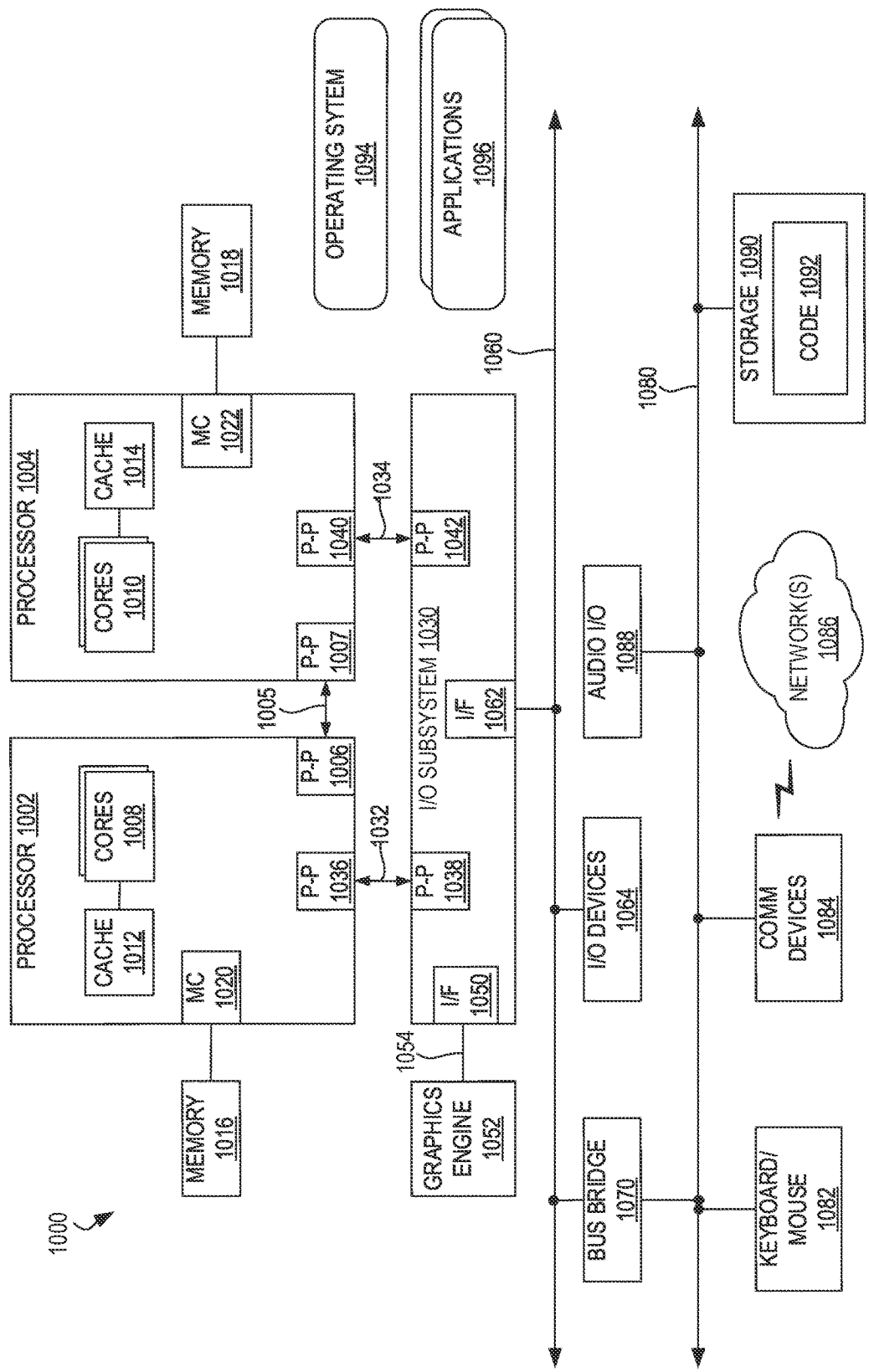
FIG. 10 is a block diagram of an example computing system in which technologies described herein may be implemented.

FIG. 10 is a block diagram of an example computing system in which technologies described herein may be implemented. Generally, components shown in FIG. 10 can communicate with other shown components, although not all connections are shown, for ease of illustration. The computing system 1000 is a multiprocessor system comprising a first processor unit 1002 and a second processor unit 1004 comprising point-to-point (P-P) interconnects. A point-to-point (P-P) interface 1006 of the processor unit 1002 is coupled to a point-to-point interface 1007 of the processor unit 1004 via a point-to-point interconnection 1005. It is to be understood that any or all of the point-to-point interconnects illustrated in FIG. 10 can be alternatively implemented as a multi-drop bus, and that any or all buses illustrated in FIG. 10 could be replaced by point-to-point interconnects.

The processor units 1002 and 1004 comprise multiple processor cores. Processor unit 1002 comprises processor cores 1008 and processor unit 1004 comprises processor cores 1010. Processor cores 1008 and 1010 can execute computer-executable instructions in a manner similar to that discussed below in connection with FIG. 10, or other manners.

Processor units 1002 and 1004 further comprise cache memories 1012 and 1014, respectively. The cache memories 1012 and 1014 can store data (e.g., instructions) utilized by one or more components of the processor units 1002 and 1004, such as the processor cores 1008 and 1010. The cache memories 1012 and 1014 can be part of a memory hierarchy for the computing system 1000. For example, the cache memories 1012 can locally store data that is also stored in a memory 1016 to allow for faster access to the data by the processor unit 1002. In some embodiments, the cache memories 1012 and 1014 can comprise multiple cache levels, such as level 1 (L1), level 2 (L2), level 3 (L3), level 4 (L4) and/or other caches or cache levels. In some embodiments, one or more levels of cache memory (e.g., L2, L3, L4) can be shared among multiple cores in a processor unit or among multiple processor units in an integrated circuit component. In some embodiments, the last level of cache memory on an integrated circuit component can be referred to as a last level cache (LLC). One or more of the higher levels of cache levels (the smaller and faster caches) in the memory hierarchy can be located on the same integrated circuit die as a processor core and one or more of the lower cache levels (the larger and slower caches) can be located on an integrated circuit dies that are physically separate from the processor core integrated circuit dies.

As used herein, the term "integrated circuit component" refers to a packaged or unpacked integrated circuit product. A packaged integrated circuit component comprises one or more integrated circuit dies mounted on a package substrate with the integrated circuit dies and package substrate encapsulated in a casing material, such as a metal, plastic, glass, or ceramic. In one example, a packaged integrated circuit component contains one or more processor units mounted on a substrate with an exterior surface of the substrate comprising a solder ball grid array (BGA). In one example of an unpackaged integrated circuit component, a single monolithic integrated circuit die comprises solder bumps attached to contacts on the die. The solder bumps allow the die to be directly attached to a printed circuit board. An integrated circuit component can comprise one or more of any computing system component described or referenced herein or any other computing system component, such as a processor unit (e.g., system-on-a-chip (SoC), processor core, graphics processor unit (GPU), accelerator, chipset processor), I/O controller, memory, or network interface controller.

Although the computing system 1000 is shown with two processor units, the computing system 1000 can comprise any number of processor units. Further, a processor unit can comprise any number of processor cores. A processor unit can take various forms such as a central processing unit (CPU), a graphics processing unit (GPU), general-purpose GPU (GPGPU), accelerated processing unit (APU), field-programmable gate array (FPGA), neural network processing unit (NPU), data processor unit (DPU), accelerator (e.g., graphics accelerator, digital signal processor (DSP), compression accelerator, artificial intelligence (AI) accelerator), controller, or other types of processing units. As such, the processor unit can be referred to as an XPU (or xPU). Further, a processor unit can comprise one or more of these various types of processing units. In some embodiments, the computing system comprises one processor unit with multiple cores, and in other embodiments, the computing system comprises a single processor unit with a single core. As used herein, the terms "processor unit" and "processing unit" can refer to any processor, processor core, component, module, engine, circuitry, or any other processing element described or referenced herein.

In some embodiments, the computing system 1000 can comprise one or more processor units that are heterogeneous or asymmetric to another processor unit in the computing system. There can be a variety of differences between the processing units in a system in terms of a spectrum of metrics of merit including architectural, microarchitectural, thermal, power consumption characteristics, and the like. These differences can effectively manifest themselves as asymmetry and heterogeneity among the processor units in a system.

The processor units 1002 and 1004 can be located in a single integrated circuit component (such as a multi-chip package (MCP) or multi-chip module (MCM)) or they can be located in separate integrated circuit components. An integrated circuit component comprising one or more processor units can comprise additional components, such as embedded DRAM, stacked high bandwidth memory (HBM), shared cache memories (e.g., L3, L4, LLC), input/output (I/O) controllers, or memory controllers. Any of the additional components can be located on the same integrated circuit die as a processor unit, or on one or more integrated circuit dies separate from the integrated circuit dies comprising the processor units. In some embodiments, these separate integrated circuit dies can be referred to as "chiplets". In some embodiments where there is heterogeneity or asymmetry among processor units in a computing system, the heterogeneity or asymmetric can be among processor units located in the same integrated circuit component. In embodiments where an integrated circuit component comprises multiple integrated circuit dies, interconnections between dies can be provided by the package substrate, one or more silicon interposers, one or more silicon bridges embedded in the package substrate (such as Intel® embedded multi-die interconnect bridges (EMIBs)), or combinations thereof.

Processor units 1002 and 1004 further comprise memory controller logic (MC) 1020 and 1022. As shown in FIG. 10, MCs 1020 and 1022 control memories 1016 and 1018 coupled to the processor units 1002 and 1004, respectively. The memories 1016 and 1018 can comprise various types of volatile memory (e.g., dynamic random-access memory (DRAM), static random-access memory (SRAM)) and/or non-volatile memory (e.g., flash memory, chalcogenide-based phase-change non-volatile memories), and comprise one or more layers of the memory hierarchy of the computing system. While MCs 1020 and 1022 are illustrated as being integrated into the processor units 1002 and 1004, in alternative embodiments, the MCs can be external to a processor unit.

Processor units 1002 and 1004 are coupled to an Input/Output (I/O) subsystem 1030 via point-to-point interconnections 1032 and 1034. The point-to-point interconnection 1032 connects a point-to-point interface 1036 of the processor unit 1002 with a point-to-point interface 1038 of the I/O subsystem 1030, and the point-to-point interconnection 1034 connects a point-to-point interface 1040 of the processor unit 1004 with a point-to-point interface 1042 of the I/O subsystem 1030. Input/Output subsystem 1030 further includes an interface 1050 to couple the I/O subsystem 1030 to a graphics engine 1052. The I/O subsystem 1030 and the graphics engine 1052 are coupled via a bus 1054.

The Input/Output subsystem 1030 is further coupled to a first bus 1060 via an interface 1062. The first bus 1060 can be a Peripheral Component Interconnect Express (PCIe) bus or any other type of bus. Various I/O devices 1064 can be coupled to the first bus 1060. A bus bridge 1070 can couple the first bus 1060 to a second bus 1080. In some embodiments, the second bus 1080 can be a low pin count (LPC) bus. Various devices can be coupled to the second bus 1080 including, for example, a keyboard/mouse 1082, audio I/O devices 1088, and a storage device 1090, such as a hard disk drive, solid-state drive, or another storage device for storing computer-executable instructions (code) 1092 or data. The code 1092 can comprise computer-executable instructions for performing methods described herein. Additional components that can be coupled to the second bus 1080 include communication device(s) 1084, which can provide for communication between the computing system 1000 and one or more wired or wireless networks 1086 (e.g. Wi-Fi, cellular, or satellite networks) via one or more wired or wireless communication links (e.g., wire, cable, Ethernet connection, radio-frequency (RF) channel, infrared channel, Wi-Fi channel) using one or more communication standards (e.g., IEEE 1002.11 standard and its supplements).

In embodiments where the communication devices 1084 support wireless communication, the communication devices 1084 can comprise wireless communication components coupled to one or more antennas to support communication between the computing system 1000 and external devices. The wireless communication components can support various wireless communication protocols and technologies such as Near Field Communication (NFC), IEEE 1002.11 (Wi-Fi) variants, WiMax, Bluetooth, Zigbee, 4G Long Term Evolution (LTE), Code Division Multiplexing Access (CDMA), Universal Mobile Telecommunication System (UMTS) and Global System for Mobile Telecommunication (GSM), and 5G broadband cellular technologies. In addition, the wireless modems can support communication with one or more cellular networks for data and voice communications within a single cellular network, between cellular networks, or between the computing system and a public switched telephone network (PSTN).

The system 1000 can comprise removable memory such as flash memory cards (e.g., SD (Secure Digital) cards), memory sticks, Subscriber Identity Module (SIM) cards). The memory in system 1000 (including caches 1012 and 1014, memories 1016 and 1018, and storage device 1090) can store data and/or computer-executable instructions for executing an operating system 1094 and application programs 1096. Example data includes web pages, text messages, images, sound files, video data, and content information to be sent to and/or received from one or more network servers or other devices by the system 1000 via the one or more wired or wireless networks 1086, or for use by the system 1000. The system 1000 can also have access to external memory or storage (not shown) such as external hard drives or cloud-based storage.

The operating system 1094 can control the allocation and usage of the components illustrated in FIG. 10 and support the one or more application programs 1096. The application programs 1096 can include common computing system applications (e.g., email applications, calendars, contact managers, web browsers, messaging applications) as well as other computing applications.

In some embodiments, a hypervisor (or virtual machine manager) operates on the operating system 1094 and the application programs 1096 operate within one or more virtual machines operating on the hypervisor. In these embodiments, the hypervisor is a type-2 or hosted hypervisor as it is running on the operating system 1094. In other hypervisor-based embodiments, the hypervisor is a type-1 or "bare-metal" hypervisor that runs directly on the platform resources of the computing system 1094 without an intervening operating system layer.

In some embodiments, the applications 1096 can operate within one or more containers. A container is a running instance of a container image, which is a package of binary images for one or more of the applications 1096 and any libraries, configuration settings, and any other information that one or more applications 1096 need for execution. A container image can conform to any container image format, such as Docker®, Appc, or LXC container image formats. In container-based embodiments, a container runtime engine, such as Docker Engine, LXU, or an open container initiative (OCI)-compatible container runtime (e.g., Railcar, CRI-O) operates on the operating system (or virtual machine monitor) to provide an interface between the containers and the operating system 1094. An orchestrator can be responsible for management of the computing system 1000 and various container-related tasks such as deploying container images to the computing system 1094, monitoring the performance of deployed containers, and monitoring the utilization of the resources of the computing system 1094.

The computing system 1000 can support various additional input devices, such as a touchscreen, microphone, monoscopic camera, stereoscopic camera, trackball, touchpad, trackpad, and one or more output devices, such as one or more speakers or displays. Any of the input or output devices can be internal to, external to, or removably attachable with the system 1000. External input and output devices can communicate with the system 1000 via wired or wireless connections. The system 1000 can further include at least one input/output port comprising physical connectors (e.g., USB, IEEE 1394 (FireWire), Ethernet, RS-232), and a power supply (e.g., battery).

In addition to those already discussed, integrated circuit components, integrated circuit constituent components, and other components in the computing system 1094 can communicate with interconnect technologies such as Intel® QuickPath Interconnect (QPI), Intel® Ultra Path Interconnect (UPI), Computer Express Link (CXL), cache coherent interconnect for accelerators (CCIX®), serializer/deserializer (SERDES), Nvidia® NVLink, ARM Infinity Link, Gen-Z, or Open Coherent Accelerator Processor Interface (OpenCAPI). Other interconnect technologies may be used and a computing system 1094 may utilize more or more interconnect technologies.

It is to be understood that FIG. 10 illustrates only one example computing system architecture. Computing systems based on alternative architectures can be used to implement technologies described herein. For example, instead of the processors 1002 and 1004 and the graphics engine 1052 being located on discrete integrated circuits, a computing system can comprise an SoC (system-on-a-chip) integrated circuit incorporating multiple processors, a graphics engine, and additional components. Further, a computing system can connect its constituent component via bus or point-to-point configurations different from that shown in FIG. 10. Moreover, the illustrated components in FIG. 10 are not required or all-inclusive, as shown components can be removed and other components added in alternative embodiments.

Figure 11:
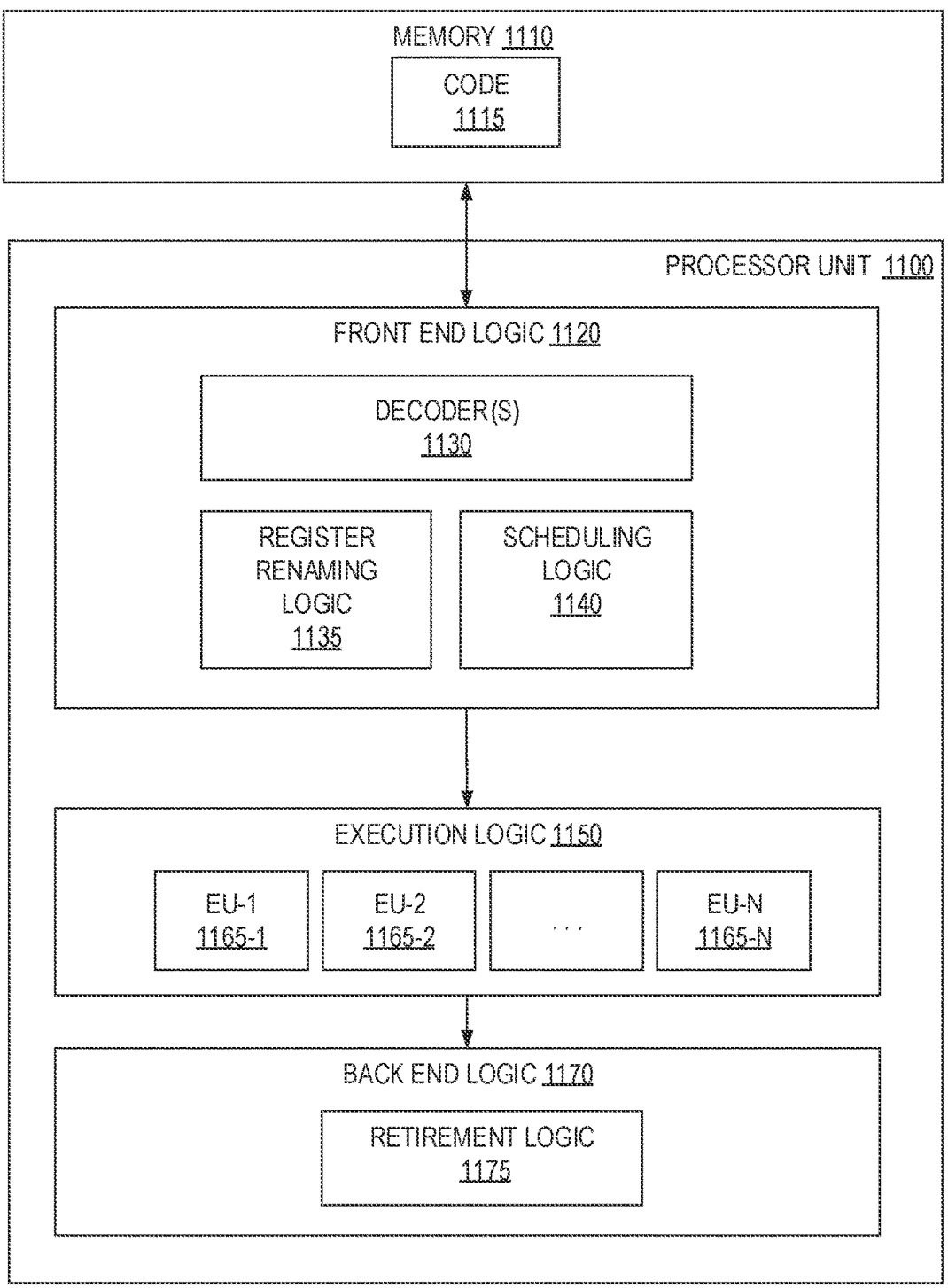
FIG. 11 is a block diagram of an example processor unit to execute computer-executable instructions as part of implementing technologies described herein.

FIG. 11 is a block diagram of an example processor unit 1100 to execute computer-executable instructions as part of implementing technologies described herein. The processor unit 1100 can be a single-threaded core or a multithreaded core in that it may include more than one hardware thread context (or "logical processor") per processor unit.

FIG. 11 also illustrates a memory 1110 coupled to the processor unit 1100. The memory 1110 can be any memory described herein or any other memory known to those of skill in the art. The memory 1110 can store computer-executable instructions 1115 (code) executable by the processor unit 1100.

The processor unit comprises front-end logic 1120 that receives instructions from the memory 1110. An instruction can be processed by one or more decoders 1130. The decoder 1130 can generate as its output a micro-operation such as a fixed width micro operation in a predefined format, or generate other instructions, microinstructions, or control signals, which reflect the original code instruction. The front-end logic 1120 further comprises register renaming logic 1135 and scheduling logic 1140, which generally allocate resources and queues operations corresponding to converting an instruction for execution.

The processor unit 1100 further comprises execution logic 1150, which comprises one or more execution units (EUs) 1165-1 through 1165-N. Some processor unit embodiments can include a number of execution units dedicated to specific functions or sets of functions. Other embodiments can include only one execution unit or one execution unit that can perform a particular function. The execution logic 1150 performs the operations specified by code instructions. After completion of execution of the operations specified by the code instructions, back-end logic 1170 retires instructions using retirement logic 1175. In some embodiments, the processor unit 1100 allows out of order execution but requires in-order retirement of instructions. Retirement logic 1175 can take a variety of forms as known to those of skill in the art (e.g., re-order buffers or the like).

The processor unit 1100 is transformed during execution of instructions, at least in terms of the output generated by the decoder 1130, hardware registers and tables utilized by the register renaming logic 1135, and any registers (not shown) modified by the execution logic 1150.

As used herein, the term "circuitry" can comprise, singly or in any combination, non-programmable (hardwired) circuitry, programmable circuitry such as processor units, state machine circuitry, and/or firmware that stores instructions executable by programmable circuitry. Modules described herein may, collectively or individually, be embodied as circuitry that forms a part of a computing system.

Any of the disclosed methods (or a portion thereof) can be implemented as computer-executable instructions or a computer program product. Such instructions can cause a computing system or one or more processor units capable of executing computer-executable instructions to perform any of the disclosed methods. As used herein, the term "computer" refers to any computing system, device, or machine described or mentioned herein as well as any other computing system, device, or machine capable of executing instructions. Thus, the term "computer-executable instruction" refers to instructions that can be executed by any computing system, device, or machine described or mentioned herein as well as any other computing system, device, or machine capable of executing instructions.

The computer-executable instructions or computer program products as well as any data created and/or used during implementation of the disclosed technologies can be stored on one or more tangible or non-transitory computer-readable storage media, such as volatile memory (e.g., DRAM, SRAM), non-volatile memory (e.g., flash memory, chalcogenide-based phase-change non-volatile memory) optical media discs (e.g., DVDs, CDs), and magnetic storage (e.g., magnetic tape storage, hard disk drives). Computer-readable storage media can be contained in computer-readable storage devices such as solid-state drives, USB flash drives, and memory modules. Alternatively, any of the methods disclosed herein (or a portion) thereof may be performed by hardware components comprising non-programmable circuitry. In some embodiments, any of the methods herein can be performed by a combination of non-programmable hardware components and one or more processing units executing computer-executable instructions stored on computer-readable storage media.

The computer-executable instructions can be part of, for example, an operating system of the computing system, an application stored locally to the computing system, or a remote application accessible to the computing system (e.g., via a web browser). Any of the methods described herein can be performed by computer-executable instructions performed by a single computing system or by one or more networked computing systems operating in a network environment. Computer-executable instructions and updates to the computer-executable instructions can be downloaded to a computing system from a remote server.

Further, it is to be understood that implementation of the disclosed technologies is not limited to any specific computer language or program. For instance, the disclosed technologies can be implemented by software written in C++, C#, Java, Perl, Python, JavaScript, Adobe Flash, C#, assembly language, or any other programming language. Likewise, the disclosed technologies are not limited to any particular computer system or type of hardware.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, cable (including fiber optic cable), magnetic communications, electromagnetic communications (including RF, microwave, ultrasonic, and infrared communications), electronic communications, or other such communication means.

As used in this application and the claims, a list of items joined by the term "and/or" can mean any combination of the listed items. For example, the phrase "A, B and/or C" can mean A; B; C; A and B; A and C; B and C; or A, B and C. As used in this application and the claims, a list of items joined by the term "at least one of" can mean any combination of the listed terms. For example, the phrase "at least one of A, B or C" can mean A; B; C; A and B; A and C; B and C; or A, B, and C. Moreover, as used in this application and the claims, a list of items joined by the term "one or more of" can mean any combination of the listed terms. For example, the phrase "one or more of A, B and C" can mean A; B; C; A and B; A and C; B and C; or A, B, and C.

The disclosed methods, apparatuses, and systems are not to be construed as limiting in any way. Instead, the present disclosure is directed toward all novel and nonobvious features and aspects of the various disclosed embodiments, alone and in various combinations and subcombinations with one another. The disclosed methods, apparatuses, and systems are not limited to any specific aspect or feature or combination thereof, nor do the disclosed embodiments require that any one or more specific advantages be present or problems be solved.

Theories of operation, scientific principles, or other theoretical descriptions presented herein in reference to the apparatuses or methods of this disclosure have been provided for the purposes of better understanding and are not intended to be limiting in scope. The apparatuses and methods in the appended claims are not limited to those apparatuses and methods that function in the manner described by such theories of operation.

Although the operations of some of the disclosed methods are described in a particular, sequential order for convenient presentation, it is to be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods can be used in conjunction with other methods.

The following examples pertain to additional embodiments of technologies disclosed herein.

Example 1 is a method comprising: sending content information to a plurality of displays controlled by the display computing systems; sending a display refresh timestamp request to a first display computing system of the plurality of display computing systems; receiving a display refresh timestamp from the first display computing system; determining clock adjustment information based on the display refresh timestamp; and sending the clock adjustment information to the first display computing system.

Example 2 comprises the method of example 1, wherein the display refresh timestamp received from the first display computing system is a first display refresh timestamp, the determining the clock adjustment information further based on a reference display refresh timestamp.

Example 3 comprises the method of example 2, further comprising determining whether an absolute difference between the reference display refresh timestamp and the first display refresh timestamp is greater than an upper drift threshold value or less than a lower drift threshold value, the determining the clock adjustment information and the sending the clock adjustment information being performed if the absolute difference between the reference display refresh timestamp and the first display refresh timestamp is greater than the upper drift threshold value or less than the lower drift threshold value.

Example 4 comprises the method of example 3, wherein if the absolute difference between the reference display refresh timestamp and the first display refresh timestamp is greater than the upper drift threshold value, the clock adjustment information, when utilized at the first display computing system, is to cause a frequency of a clock of the first display computing system to increase if the first display refresh timestamp is greater than the reference display refresh timestamp and decrease if the reference display refresh timestamp is greater than the first display refresh timestamp.

Example 5 comprises the method of example 3, wherein if the absolute difference between the reference display refresh timestamp and the first display refresh timestamp is less than the lower drift threshold value, the clock adjustment information, when utilized at the first display computing system, is to cause a frequency of a clock of the first display computing system to decrease if the first display refresh timestamp is greater than the reference display refresh timestamp and increase if the reference display refresh timestamp is greater than the first display refresh timestamp Example 6 comprises the method of example 5, wherein the upper drift threshold value is about equal to a display refresh time interval based on a frame rate at which the content is to be displayed and the lower drift threshold value is about equal to one-half the display refresh time interval.

Example 7 comprises the method of example 5, wherein the upper drift threshold value is about 16 ms and the lower drift threshold value is about 8 ms.

Example 8 comprises the method of example 2, further comprising determining whether an absolute difference between the reference display refresh timestamp and the first display refresh timestamp is greater than a drift threshold value, the determining the clock adjustment information and the sending the clock adjustment information being performed if the absolute difference is greater than the drift threshold value.

Example 9 comprises the method of example 8, wherein if the absolute difference between the reference display refresh timestamp and the first display refresh timestamp is greater than the drift threshold value, the clock adjustment information, when utilized at the first display computing system, is to cause a frequency of a clock of the first display computing system to increase if the first display refresh timestamp is greater than the reference display refresh timestamp and to decrease if the reference display refresh timestamp is greater than the first display refresh timestamp.

Example 10 comprises the method of example 8, wherein the drift threshold value is about equal to a display refresh time interval based on a frame rate at which the content is to be displayed.

Example 11 comprises the method of example 8, wherein the drift threshold value is about 2 ms.

Example 12 comprises the method of any one of examples 2-11, wherein the reference display refresh timestamp is associated with a refresh of a display controlled by a control computing system, the control computing system performing the sending the content information to the display computing systems, the sending the display refresh timestamp request, the receiving the display refresh timestamp, and the sending the clock adjustment information.

Example 13 comprises the method of example 12, wherein the reference display refresh timestamp is associated with a display refresh most recently performed by the control computing device.

Example 14 comprises the method of example 12, further comprising, at the control computing system, generating the reference display refresh timestamp.

Example 15 comprises the method of any one of examples 12-14, further comprising: receiving, at the control computing system, clock synchronization information prior to sending the content information to the display computing systems; and adjusting a clock of the control computing system based on the clock synchronization information.

Example 16 comprises the method of example 12, wherein the reference display refresh timestamp is the display refresh timestamp received from the first display computing system, the method further comprising: generating a control system display refresh timestamp associated with a display refresh of the control computing system; determining that an absolute difference between the reference display refresh timestamp and the control system display refresh timestamp exceeds a drift threshold value; determining control system clock adjustment information; and adjusting a clock of the control computing system based on the control system clock adjustment information.

Example 17 comprises the method of any one of examples 2-11, wherein the reference display refresh timestamp is associated with a refresh of a display controlled by the first display computing system.

Example 18 comprises the method of any one of examples 1-17, wherein the clock adjustment information comprises phase-locked loop adjustment information.

Example 19 comprises the method of example 18, wherein the clock adjustment information comprises phase-locked loop register information.

Example 20 comprises the method of any one of examples 1-19, further comprising sending clock synchronization information to the display computing systems prior to the sending the content information to the display computing systems.

Example 21 is a method comprising: receiving, at a display computing system that is part of a multi-display system, content information representing content to be displayed at a display controlled by the display computing system; causing the content to be displayed at the display; receiving, at a display computing system, a display refresh timestamp request from a control computing system; sending, from the display computing system, a display refresh timestamp to the control computing system; receiving, at the display computing system, clock adjustment information from the control computing system; and adjusting a clock of the display computing system based on the clock adjustment information.

Example 22 comprises the method of example 21, wherein the clock adjustment information comprises phase-locked loop adjustment information.

Example 23 comprises the method of example 21, wherein the clock adjustment information comprises phase-locked loop register information.

Example 24 comprises the method of example 21, wherein the adjusting the clock of the display computing system comprises writing values to one or more phase-locked loop control registers based on the clock adjustment information.

Example 25 comprises the method of any one of examples 21-24, wherein the display refresh timestamp is associated with a display refresh most recently performed by the display computing device.

Example 26 comprises the method of any one of examples 21-25, further comprising generating the display refresh timestamp.

Example 27 comprises the method of any one of examples 21-26, further comprising: receiving clock synchronization information from the control computing system prior to receiving the content information; and adjusting the clock of the display computing device based on the clock synchronization information.

Example 29 is one or more non-transitory computer-readable storage media having instructions stored thereon that, when executed by one or more processing units, cause the one or more processing units to perform any one of the methods of examples 1-27.

Example 30 is a computing system comprising: one or more processing units; and one or computer-readable storage media having instructions stored thereon that, when executed by the one or more processing units, cause the one or more processing units to perform any one of the methods of examples 1-27.

Example 31 is a computing system comprising one or more means to perform any one of the methods of examples 1-27.

The invention claimed is:

1. A method comprising:
sending content information to a plurality of display computing systems, the content information representing content to be displayed at a plurality of displays controlled by the plurality of display computing systems;
sending a display refresh timestamp request to a first display computing system of the plurality of display computing systems;
receiving a first display refresh timestamp from the first display computing system;
wherein a drift threshold value is about equal to a display refresh time interval based on a frame rate at which the content is to be displayed,
determining that an absolute difference between a reference display refresh timestamp and the first display refresh timestamp is greater than the drift threshold value;
determining clock adjustment information based on the first display refresh timestamp and the reference display refresh timestamp; and
sending the clock adjustment information to the first display computing system.

2. The method of claim 1, further comprising determining whether an absolute difference between the reference display refresh timestamp and the first display refresh timestamp is greater than an upper drift threshold value or less than a lower drift threshold value, the determining the clock adjustment information and the sending the clock adjustment information being performed if the absolute difference between the reference display refresh timestamp and the first display refresh timestamp is greater than the upper drift threshold value or less than the lower drift threshold value.

3. The method of claim 2, wherein if the absolute difference between the reference display refresh timestamp and the first display refresh timestamp is greater than the upper drift threshold value, the clock adjustment information, when utilized at the first display computing system, is to cause a frequency of a clock of the first display computing system to increase if the first display refresh timestamp is greater than the reference display refresh timestamp and decrease if the reference display refresh timestamp is greater than the first display refresh timestamp.

4. The method of claim 2, wherein if the absolute difference between the reference display refresh timestamp and the first display refresh timestamp is less than the lower drift threshold value, the clock adjustment information, when utilized at the first display computing system, is to cause a frequency of a clock of the first display computing system to decrease if the first display refresh timestamp is greater than the reference display refresh timestamp and increase if the reference display refresh timestamp is greater than the first display refresh timestamp.

5. The method of claim 4, wherein the upper drift threshold value is about equal to the display refresh time interval based on the frame rate at which the content is to be displayed and the lower drift threshold value is about equal to one-half the display refresh time interval.

6. The method of claim 1, wherein if the absolute difference between the reference display refresh timestamp and the first display refresh timestamp is greater than the drift threshold value, the clock adjustment information, when utilized at the first display computing system, is to cause a frequency of a clock of the first display computing system to increase if the first display refresh timestamp is greater than the reference display refresh timestamp and to decrease if the reference display refresh timestamp is greater than the first display refresh timestamp.

7. The method of claim 1, wherein the reference display refresh timestamp is associated with a refresh of a display controlled by a control computing system, the control computing system performing the sending the content information to the plurality of display computing systems, the sending the display refresh timestamp request, the receiving the display refresh timestamp, and the sending the clock adjustment information.

8. The method of claim 7, wherein the reference display refresh timestamp is associated with a display refresh most recently performed by the control computing system.

9. The method of claim 7, wherein the reference display refresh timestamp is the display refresh timestamp received from the first display computing system, the method further comprising:
generating a control system display refresh timestamp associated with a display refresh of the control computing system;
determining that an absolute difference between the reference display refresh timestamp and the control system display refresh timestamp exceeds a drift threshold value;
determining control system clock adjustment information; and
adjusting a clock of the control computing system based on the control system clock adjustment information.

10. The method of claim 1, wherein the reference display refresh timestamp is associated with a refresh of a display controlled by the first display computing system.

11. The method of claim 1, wherein the clock adjustment information comprises phase-locked loop adjustment information.

12. The method of claim 1, further comprising sending clock synchronization information to the display computing systems prior to the sending the content information to the display computing systems.

13. One or more non-transitory computer-readable storage media having instructions stored thereon that, when executed by one or more processing units, cause the one or more processing units to:
send content information to a plurality of display computing systems, the content information representing content to be displayed at a plurality of displays controlled by the plurality of display computing systems;

send a display refresh timestamp request to a first display computing system of the plurality of display computing systems;

receive a first display refresh timestamp from the first display computing system;

determine that an absolute difference between a reference display refresh timestamp and the first display refresh timestamp is greater than an upper drift threshold value or less than a lower drift threshold value;

determine clock adjustment information based on the first display refresh timestamp and a reference display refresh timestamp;

send the clock adjustment information to the first display computing system;

wherein:

if the absolute difference between the reference display refresh timestamp and the first display refresh timestamp is greater than the upper drift threshold value, the clock adjustment information, when utilized at the first display computing system, is to cause a frequency of a clock of the first display computing system to increase if the first display refresh timestamp is greater than the reference display refresh timestamp and decrease if the reference display refresh timestamp is greater than the first display refresh timestamp; and if the absolute difference between the reference display refresh timestamp and the first display refresh timestamp is less than the lower drift threshold value, the clock adjustment information, when utilized at the first display computing system, is to cause a frequency of a clock of the first display computing system to decrease if the first display refresh timestamp is greater than the reference display refresh timestamp and increase if the reference display refresh timestamp is greater than the first display refresh timestamp.

14. The one or more non-transitory computer-readable storage media of claim 13, the instructions to further cause the one or more processing units to whether an absolute difference between the reference display refresh timestamp and the first display refresh timestamp is greater than a drift threshold value, to determine the clock adjustment information and to send the clock adjustment information being performed if the absolute difference is greater than the drift threshold value, wherein if the absolute difference between the reference display refresh timestamp and the first display refresh timestamp is greater than the drift threshold value, the clock adjustment information, when utilized at the first display computing system, is to cause a frequency of a clock of the first display computing system to increase if the first display refresh timestamp is greater than the reference display refresh timestamp and to decrease if the reference display refresh timestamp is greater than the first display refresh timestamp.

15. A computing system comprising:
one or more processing units; and
one or computer-readable storage media having instructions stored thereon that, when executed by the one or more processing units, cause the one or more processing units to:
send content information to a plurality of display computing systems, the content information representing content to be displayed at a plurality of displays controlled by the display computing systems;
send a display refresh timestamp request to a first display computing system of the plurality of display computing systems;
receive a first display refresh timestamp from the first display computing system;
wherein a drift threshold value is about equal to a display refresh time interval based a frame rate at which the content is to be displayed, determine that an absolute difference between a reference display refresh timestamp and the first display refresh timestamp is greater than the drift threshold value;
determine clock adjustment information based on the first display refresh timestamp and a reference display refresh timestamp; and
send the clock adjustment information to the first display computing system.

16. The computing system of claim 15, further comprising determining whether an absolute difference between the reference display refresh timestamp and the first display refresh timestamp is greater than an upper drift threshold value or less than a lower drift threshold value, the determining the clock adjustment information and to send the clock adjustment information being performed if the absolute difference between the reference display refresh timestamp and the first display refresh timestamp is greater than the upper drift threshold value or less than the lower drift threshold value.

17. The computing system of claim 16, wherein:
if the absolute difference between the reference display refresh timestamp and the first display refresh timestamp is greater than the upper drift threshold value, the clock adjustment information, when utilized at the first display computing system, is to cause a frequency of a clock of the first display computing system to increase if the first display refresh timestamp is greater than the reference display refresh timestamp and decrease if the reference display refresh timestamp is greater than the first display refresh timestamp; and if the absolute difference between the reference display refresh timestamp and the first display refresh timestamp is less than the lower drift threshold value, the clock adjustment information, when utilized at the first display computing system, is to cause a frequency of a clock of the first display computing system to decrease if the first display refresh timestamp is greater than the reference display refresh timestamp and increase if the reference display refresh timestamp is greater than the first display refresh timestamp.

18. The computing system of claim 15, further comprising determining whether an absolute difference between the reference display refresh timestamp and the first display refresh timestamp is greater than a drift threshold value, the determining the clock adjustment information and to send the clock adjustment information being performed if the absolute difference is greater than the drift threshold value, wherein if the absolute difference between the reference display refresh timestamp and the first display refresh timestamp is greater than the drift threshold value, the clock adjustment information, when utilized at the first display computing system, is to cause a frequency of a clock of the first display computing system to increase if the first display refresh timestamp is greater than the reference display refresh timestamp and to decrease if the reference display refresh timestamp is greater than the first display refresh timestamp.

* * * * *